United States Patent
Sieling et al.

(10) Patent No.: US 11,663,400 B2
(45) Date of Patent: *May 30, 2023

(54) CONFIGURATION AND DEPLOYMENT OF EXTENSIBLE TEMPLATES

(71) Applicant: MEI Research, Ltd., Edina, MN (US)

(72) Inventors: Jared D. Sieling, Maple Grove, MN (US); James P. Shields, Minneapolis, MN (US)

(73) Assignee: MEI Research, Ltd., Edina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,812

(22) Filed: Jan. 13, 2021

(65) Prior Publication Data

US 2021/0133393 A1 May 6, 2021

Related U.S. Application Data

(63) Continuation of application No. 14/959,775, filed on Dec. 4, 2015, now Pat. No. 10,909,312.

(60) Provisional application No. 62/088,023, filed on Dec. 5, 2014.

(51) Int. Cl.
*G06F 17/00* (2019.01)
*G06F 40/186* (2020.01)
*G06F 40/106* (2020.01)

(52) U.S. Cl.
CPC .......... *G06F 40/186* (2020.01); *G06F 40/106* (2020.01)

(58) Field of Classification Search
None
See application file for complete search history.

(56) References Cited

U.S. PATENT DOCUMENTS

| 7,225,343 B1 | 5/2007 | Honig et al. |
| 8,554,802 B1 | 10/2013 | Barden et al. |
| 2007/0130511 A1 | 6/2007 | Roberge et al. |
| 2010/0325207 A1* | 12/2010 | Churchill ............... H04L 51/14 709/204 |

(Continued)

OTHER PUBLICATIONS

"U.S. Appl. No. 14/959,775, Appeal Brief filed Jul. 9, 2020", 27 pgs.

(Continued)

*Primary Examiner* — Mustafa A Amin
(74) *Attorney, Agent, or Firm* — Schwegman Lundberg & Woessner, P.A.

(57) ABSTRACT

Configurations and techniques for a research study management system are disclosed, enabling deployment of an extensible, reproducible, and deployable template for use in assessment, intervention, or other research studies. In an example, a technique to configure a template to use in a research project includes associating the template with one or more instruments to collect project data, associating the template with one or more tools to process the collected project data, associating the template with a data set definition, and defining one or more rules of operation for the template. In a further example, a technique to deploy the template for use in a research project includes defining a schedule based on the template, defining a plurality of configuration parameters of one or more instruments, and deploying the template to engage a human study participant to perform data collection activities via the one or more instruments.

25 Claims, 18 Drawing Sheets

(56) References Cited

U.S. PATENT DOCUMENTS

| | | | |
|---|---|---|---|
| 2012/0130934 A1 | 5/2012 | Brillhart et al. | |
| 2014/0142963 A1 | 5/2014 | Hill et al. | |
| 2015/0294090 A1* | 10/2015 | Kodiyan | G16Z 99/00 |
| | | | 705/2 |
| 2015/0363563 A1 | 12/2015 | Hallwachs | |
| 2016/0124930 A1 | 5/2016 | Dhawan et al. | |

OTHER PUBLICATIONS

"U.S. Appl. No. 14/959,775, Examiner Interview Summary dated Dec. 20, 2019", 3 pgs.

"U.S. Appl. No. 14/959,775, Final Office Action dated Jan. 9, 2020", 29 pgs.

"U.S. Appl. No. 14/959,775, Final Office Action dated Feb. 21, 2019", 33 pgs.

"U.S. Appl. No. 14/959,775, Non Final Office Action dated Jun. 25, 2018", 25 pgs.

"U.S. Appl. No. 14/959,775, Non Final Office Action dated Sep. 13, 2019", 33 pgs.

"U.S. Appl. No. 14/959,775, Notice of Allowance dated Oct. 2, 2020", 9 pgs.

"U.S. Appl. No. 14/959,775, Notice of Allowance dated Oct. 6, 2020", 4 pgs.

"U.S. Appl. No. 14/959,775, Prelimiary Amendment filed Apr. 20, 2016", 3 pgs.

"U.S. Appl. No. 14/959,775, Response filed Oct. 24, 2018 to Non Final Office Aciton dated Jun. 25, 2018", 17 pgs.

"U.S. Appl. No. 14/959,775, Response filed Dec. 13, 2019 to Non Final Office Action dated Sep. 13, 2019", 14 pgs.

"U.S. Appl. No. 14/959,775, Response filed Jun. 21, 2019 to Final Office Action dated Feb. 21, 2019", 12 pgs.

Oreskovic, et al., "Integrating mHealth and Systems Science: A Combination Apporach to Prevent and Treat Chronic Health Conditions", 4.

\* cited by examiner

PiLR : HEALTH  JMDemoDualCohort ⌄                  @ ❀ jmoon ⌄

Project › Instruments › PiLR EMA App

⇪ PiLR EMA App » EMA Configuration Builder          Overview  Survey Responses [Builder]

❀ EMA Configuration » Survey Collection             | Select other configuration... ⌄ | [Show]

---

▼ This is what the app will look like ⌄

PiLR EMA

| Home | Tasks |
|------|-------|

☺ Welcome!
This is an example of a simple card to be shown on a tab when the app is opened. You can edit the cards that show on this tab, add more, and rearrange the order.

✎ Take a Survey
Thanks for taking the Patient Questionnaire

♨ Or another survey
Take the PHQ-8 personal health questionnaire

Edit these cards to be shown to the participant through the bottom "App Tabs" box to the right.

---

Surveys                                                                                           <

Surveys are delivered to participants through the app on their mobile phone. Participants are prompted to take a survey through a notification on the device. The surveys can be triggered by a self-report event, or from an event that is specified in an "Assessment Probe", below.

📋 Surveys                                                                              | + Add |

| ▸ Survey Name | ▸ 🗐 Questions | | |
|---|---|---|---|
| Personal Health Questionaire Depression Scale (PHQ-8) (85488) ⓘ | 9 | ✎ | 🗑 |
| SF-12 Patient Questionaire (98104) ⓘ | 16 | ✎ | 🗑 |

---

Trigger Criteria                                                                                  <

Trigger criteria are the components used to describe the how, when and what of getting information from the participants. These are many options for each trigger criteria, but they generally follow the "If this, then that" structure. To setup these conditions, you'll create what are called Triggers and Actions.

⇄ Trigger Criteria                                                                      | + Add |

| ▸ Name | ▸ Trigger | ▸ Actions | |
|---|---|---|---|
| MWF Survey (63775) | 1 | 1 | 🗑 |
| TTHS Survey (37631) | 1 | 1 | 🗑 |

PILR Health Project 1 ▾  🏠 🕐 📁▾ 🔒▾ 📊 ⚙▾ jondoe ▾

Edit template >> Template 2.2

Project periods
This tempate is linked to 1 project period. you can set the relative offset and duration of each epoch with the period Active Period 2 (3 epochs)  ✏

Epoch 2.1 >>Day 1 to day 7
Epoch 2.2 >>Day 8 to day 14
Epoch 2.3 >>Day 15 to day 21

[Remove a project period] [Add a project period]

Active instruments
There currently are 2 instruments set to be used for this template.

Instrument 1
Instrument 2

[Remove an instrument] [Add an instrument]

Instrument Settings
For the instruments listed above, you can set values for the instrument settings to be used or changed across the epochs of this project period.

+ Instrument 1
- Instrument 2

Active Period 2  ✏

| Setting | Default | Epoch 1 | Epoch 2 | Epoch 3 |
|---|---|---|---|---|
| Maximam Sedentary time | 30 | 30 | 60 | 120 |
| Minimum active time | 3 | 3 | 6 | 10 |
| Sleep mode time | 8:00pm | (default) | (default) | (default) |
| Energy threshold | .8 | (default) | (default) | (default) |

| PiLR : HEALTH JMDemoDualCohort ⌄ | | jmoon ⌄ |
|---|---|---|
| Configuration > Deployment Templates | | |

Template: Control >View and edit the participant deployment template configuration

| Schedule \| Info |
|---|
| Specify project periods the template can be used for.start and end days of each epoch can be set relative to the start of the period. Actual calendar dates of epochs will be set at the time a participant is deployed from the template. |
| – Participant Active Period |
| Epoch 1 > Day 1 to Day 14 |

Actions
- Add an instrument
- Add a project period
- Edit template info

Select a different template ⌄

Submit→

Instruments Used
- Pilr EMA App

Instrument Settings

Set instrument settings for each period, or leave as default values. Instrument settings get copied to a participant at the time their period is scheduled.

– Pilr EMA App

| Period: Participant Active Period | | |
|---|---|---|
| Setting | Default | Epoch 1 |
| Do Not Disturb | false | false |
| App Do not Disturb end time | 08:00 | 08:00 |
| App Do not disturb start time | 20:00 | 20:00 |
| EMA Configuration | not specified | Survey Collection |
| Interval for data collection(minutes) | 60 | 60 |
| GPS Provider | true | true |
| Network Provider | false | false |

*FIG. 6B*

PILR Health Project 1 ▾    ⇦ ⌂ ▾ 🏠 ▾ 📁 ▾ 🏢 ▾ ⚙ ▾   jondoe ▾

Instrument 2

Instrument settings: template configurations by period

– Period: Participant active period

Template: Default template

| Setting | Default | Epoch 1 | Epoch 2 |
|---|---|---|---|
| Sleep time | 8:00 pm | 8:00 pm | 8:00 pm |
| Activity duration in minutes | 30 | 120 | 60 |

Template: Secondary template

| Setting | Default | Epoch 1 | Epoch 2 |
|---|---|---|---|
| Sleep time | 8:00 pm | 8:00 pm | 8:00 pm |
| Activity duration in minutes | 60 | 30 | 120 |

– Period: Follow-up period

Template: Follow-up template

| Setting | Default | Epoch 1 | Epoch 2 |
|---|---|---|---|
| Sleep time | 8:00 pm | 8:00 pm | 8:00 pm |
| Activity duration in minutes | 30 | 120 | 60 |

Instrument Overview

Settings
Sleep time
Activity duration in minutes

Datasets
Minute activity classification
App events
App info log

Active Templates
Default Template
Secondary Template
Follow-up template

① PiLR : HEALTH Group Testing 1 ⌄　　🏠 ⌘ 📖 🎫 ⚙⌄ 🔍⌄ | jsieling ⌄

Coordinate > Project Participants > 301 : ABC

Participant 301 : ABC >> View and edit participant setup

Participant Code    301
Description    ABC
Date Created    09/20/2014 17:20

⊙ Schedule | ≡ Instrument Settings | 👥 Groups | ☐ Devices

○ Schedule of Participant Periods

View and schedule the active time periods for the participant. At the time a period is scheduled, all configuration options are copied from the assigned template to the participant.

Participant Active Period >> Spans 14 days    ( ☐ Not scheduled )   ⊕

Participant followup period >> Spans 14 days    ( ☐ Not scheduled )   ⊕

| ☑ Actions |
|---|
| Setup new device activation info |
| Edit participant's code or description |
| Add another participant to the project |

Set Start Date
Select the day the active period should begin.
Configuration template: | Default Template |
Participant Active Period Start Date | 09/19/2014 |

Save | Cancel

CONFIGURATION AND DEPLOYMENT OF EXTENSIBLE TEMPLATES

PRIORITY

This application is a continuation of U.S. patent application Ser. No. 14/959,775, filed Dec. 4, 2015, which claims the priority benefit of U.S. Provisional Application Ser. No. 62/088,023, filed Dec. 5, 2014, which is hereby incorporated by reference in its entirety.

TECHNICAL FIELD

The examples described herein relate to software, user interfaces and interactions, data storage and related methods to support research, clinical trials, and monitoring in connection with such activities.

BACKGROUND

Managing research studies presents many challenges, including defining protocols, recruiting participants, and reporting. However, perhaps the single most important challenge is managing data. This problem compounds in mobile-health (mHealth) studies, where study participants may be generating high-density data from multiple devices (e.g., devices such as wearables, smartphones, medical monitoring devices, and the like) during the participants' enrollment. Existing systems that manage studies rely on data management systems that are permanently supported by software developers and engineers familiar with device technologies and relevant science. Working with data resources often is ad-hoc, expensive, and cumbersome because there are no common schemas or interfaces. Further, existing systems do not combine immediate objective and subjective information with large-scale resources. For example, researchers and public planners often need simple and efficient means to combine public data resources (e.g., Health.gov data and GIS maps) interactively with other sources of geospatial data at a local level.

Spreadsheets are still a common tool to record participant information. However, spreadsheets quickly become unwieldy because typically data values are not validated. A simple mobile health technology (mHealth) study may require participants to wear an accelerometer on their wrist continuously for a week, and a sleep-tracker at night. The researcher may be testing the effect of two different diets and measuring the amount of physical activity per day, and sleep quality. As participants are enrolled, investigators are required to track an individual's baseline data, dates of enrollment, device assignments, and device settings. In more advanced designs, participants may be scheduled to add or remove devices during the course of the study, further complicating data management.

BRIEF DESCRIPTION OF THE DRAWINGS

FIG. 2B illustrates a screenshot of a graphical user interface used to further configure surveys and trigger criteria to collect information according to an example described herein.

FIG. 6A illustrates a wireframe sketch of a graphical user interface used to set up a deployment template according to an example described herein.

FIG. 6B illustrates a screenshot of a graphical user interface used to further configure a deployment template according to an example described herein.

FIG. 7 illustrates a wireframe sketch of a graphical user interface used to view settings for a deployment template according to an example described herein.

FIG. 8A illustrates a screen shot of a graphical user interface used to select and apply a deployment template for a participant according to an example described herein.

FIG. 8B illustrates a further screenshot of a graphical user interface used to configure settings for a deployment template for a participant according to an example described herein.

GLOSSARY

Figure 1:
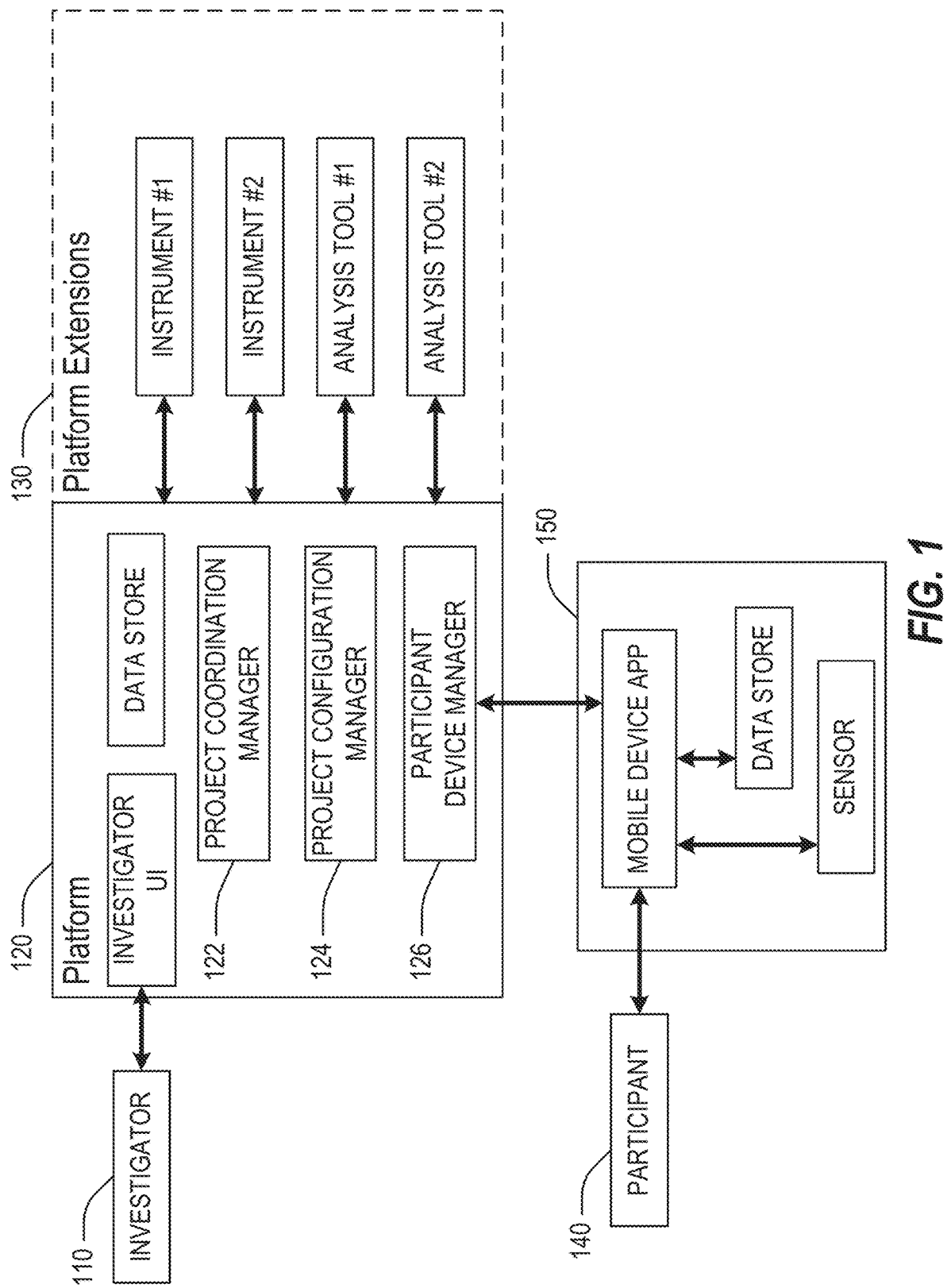
FIG. 1 illustrates a block diagram of an extensible template system platform and related components for study deployments according to an example described herein.

As used herein, the terms listed below correspond to the associated meanings. Other terms are further defined in U.S. Pat. No. 8,554,802, "System to dynamically collect and synchronize data with mobile devices". This patent and all other referenced patents and applications are incorporated herein by reference in their entirety. Where a definition or use of a term in a reference, which is incorporated by reference herein, is inconsistent or contrary to the definition of that term provided herein, the definition of that term provided herein applies and the definition of that term in the reference does not apply.

Coordinator—a person who performs tasks associated with setting up and deploying Participants into an assessment or intervention Program. This could be done by someone on a research team, a nurse, or a clinician.

Configurator—a person who performs tasks associated with configuring a Project for an assessment of intervention Program. This includes setting up components to run one or multiple protocols for Participants.

Participant—a person receiving an assessment or intervention protocol, interacting with one or more Instruments.

Instrument—a device or interface used to deliver an assessment or intervention to a Participant, to collect data, and/or deliver feedback to the Participant. This can include mobile applications, sensor devices, and web portals that Participants use.

Protocol—the time schedule and delivery settings of the assessment or intervention.

Active period—the time or date range of the assessment or intervention delivery for a Participant.

Period epoch—a subset of an Active period over which the same delivery settings are set.

Template—a set of options used to configure Instruments, data handling, and analysis parameters, along with a schedule to automatically update the values over time.

Platform—the components of software and hardware that are considered core and independent of any individual Extension component. Extension components are built on top of the Platform components, and utilize the Platform components so as to not have to reproduce common functionality.

Extension—a hardware or software component that adds functionality to the Platform, utilizing the Platform capabilities. Extensions can be categorized as Instruments or Analysis Tools.

Event Tag—a data tag created by a Configurator that can identify when events of interest happened. Sleeping, eating, and running are examples of activity tags. These tags can be used by researchers to provide a standard characterization based on observation (either manual or automated). As an example, the researcher could code the period from 11:00 pm to 6:00 am as sleep. This could be helpful in understanding why the Participant's respiration, breathing, and heart rate were all reduced.

Event Bundle—a group of Event Tags can be used to characterize the collected data about the Participant.

Program—an assessment or intervention that a Participant completes, set up by a Coordinator. A Program can include multiple protocols, but a Participant will only be delivered one of those protocols.

Project—an isolated set of Participants enrolled in one or multiple Programs which will operate independent of other Projects on the Platform.

Organization—a research institution or department that plans and conducts research studies. An Organization can create and engage in one or more Projects simultaneously.

Group Category—a taxonomy concept used to divide Participants (e.g., Project Participants) into distinct groups for analytical comparison or other analysis.

DETAILED DESCRIPTION

The examples described herein are directed to uses, configurations, and related techniques of a research study management system. One example of a research study management system, further referred to herein as the "Platform", can allow a Coordinator to easily deploy Participants into a Protocol for a remote assessment or intervention Program, delivered through one or multiple Instruments and Tools. As further described herein, the Platform operates through the deployment of an extensible, reproducible, and deployable "Template", for use in a respective Program or similar research study applications.

The assessments or interventions of the subject Program can be designed to include the Participant interacting with the Instruments through mobile devices over extended periods (from days to years), and with delivery configurations that change over that time. The Instruments are used to collect data on the Participants for the investigators, and to deliver feedback according to the assigned Protocol. The use of a deployable Template in such a Program is useful for management of the research study because a Template provides a mechanism to specify groupings of setup and changes of configurations for Instruments and Analysis Tools over time to be automated by the Platform, and use those Templates to deploy Participants into a Program. This is in contrast to setting up configuration options for each individual Participant, and manually making changes to configuration options over time for each individual Participant.

Accordingly, the use of deployment Templates enables "create once, deploy many" functionality for an entire assessment or intervention Program, which significantly reduces the required manual effort and management time and also minimizes opportunities for human error. The Template mechanism is extensible by being a component of the Platform itself, and not any individual Instrument or Analysis Tool. The Platform Extensions provide the interface between the Template components and any processes required to configure the devices or third party systems.

In example settings, the deployable Template configuration and research Platform described herein can be used to collect signals, images, sound, and other information from mobile monitors, laboratory instrumentation, and other objective data sources. This information can be coordinated in with responses on food choice, activity, ratings of exertion, mood, location, smoking episodes, pain, alcohol consumption, medication dosing, companions and any other input sought by investigators, clinicians, advisers, or counselors in the research study. Collected data can be combined with data that characterizes Participants by age, sex, economic status, and study group. Collected data can be characterized using Event Tags to note significant events that have occurred, or via automated processes running in an Instrument, or via an Extension running on the Platform. For example, application areas for the examples described herein can include: assessing energy balance (dietary intake, physical activity and weight); acquiring context information on actions and the physical or psycho-social environment; and assisting individuals, alone or supported by clinicians or other care givers, to manage particular behaviors (such as weight, diet, addiction, medication). As a result, the applicability of the deployable Templates and the research Platform to a variety of study types and research areas is significantly broad.

Services provided using the deployable Template configuration described herein can address the rapidly growing need to replace data management systems that are permanently supported by software developers and engineers. The deployable Template configuration can integrate with systems accessing a variety of primary and secondary data sources in a common local repository that supports a set of easy to use, customizable interfaces. Further, the deployable Template configuration can allow merging, manipulating, and visualizing data obtained from the research study to answer questions for research and public policy planning.

Another aspect of the deployable Template configuration described herein enables data from individuals (and from both internal and external data resources) to be integrated with crowd source approaches. Mobile devices already collect and forward high quality data in close to real time. Capitalizing on this capability for health research studies, for example, will further enhance public health planning and promotion. In addition, the deployable Template configuration described herein can allow users to conduct assessments without needing special training or support in programming, information technologies or geographic analysis. (For example, as further described below with reference to FIG. 10, health assessments can be combined and integrated in connection with geographic data.)

Overview of Platform

The following describes a modular Platform for configuring and managing a Program. This Platform can include components to collect and process data, report results, and conduct other operations. Each component integrates into the Platform with defined interfaces, and provides access to other "core" components of the Platform, as well as Extensions to the Platform. The adaptable deployment Templates, further described below, can serve to retain and coordinate each of these components over time.

FIG. 1 depicts a block diagram of components of a Platform 120 used in an example embodiment, illustrating the Platform 120 and related components, and the flow of information between these entities. An investigator 110 can interact with the Platform 120 through a central website as the user interface, for example. Through the website, the investigator 110 is able to manage one or multiple Projects. For each Project, the Platform 120 provides core functionality to manage the various software components needed to deliver an assessment or intervention Protocol to Participants such as a particular Participant 140. This functionality includes operation of a data store designated to collect and store Participant information and data for the Project, including data collected by an Instrument device 150.

The Project coordination manager component 122 provides functionality to schedule Participants, permit changes in configuration, and manage Participant devices. The Project configuration manager component 124 provides the functionality needed to configure Protocols for the Project (e.g., which Instruments will be used and what configuration should be used for the Instruments), and one or multiple deployment Templates to specify these configurations.

Figure 2A:
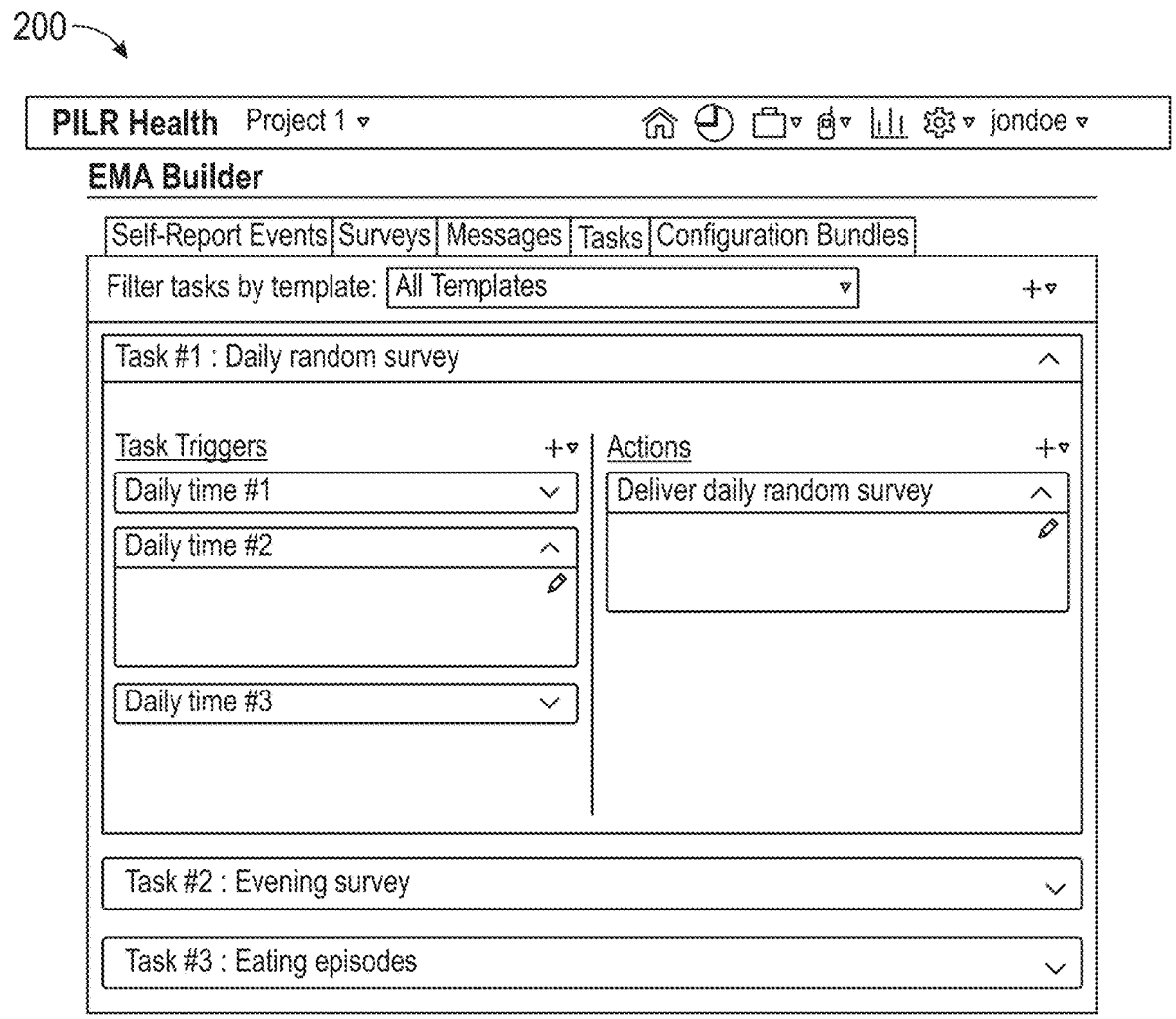
FIG. 2A illustrates a wireframe sketch of a graphical user interface used to configure surveys and delivery logic for study deployments according to an example described herein.

One or multiple Extensions 130 can be added on the Platform. Extensions can include Instruments, which can be hardware or software components related to collecting data from Participants and delivering feedback; and Analysis Tools, which are used by investigators to process data that has been collected for Participants. Extensions interface with core Platform components to provide broader capabilities to investigators. As an example, an Instrument could be a mobile software application (mobile app) that is installed on a Participant's smartphone (e.g., Instrument device 150), and communicates with the Platform 120 to setup the delivery configuration and store collected data generated through the mobile app As a further example of an Instrument, "PiLR EMA" (Ecological Momentary Assessment) provides a smartphone application for Participants to install on their smartphone devices. This app delivers a pre-configured set of surveys and messages based on trigger events or a time schedule. Settings for PiLR EMA can be modified based on information received from the Platform 120 and other sources according to algorithms entered in advance by a Configurator or loaded from a separate resource such as an analytic library (for example, an "R Project" package). Thus, PiLR EMA can change the data that it collects and the information that it presents to a Participant according to either a schedule preset by the Configurator (such as part of a Template), or by real-time changes made by the Configurator. An example of screens that a Configurator could use to setup a representative Protocol are shown in FIGS. 2A and 2B, and are described in detail below.

As another example of an Instrument, a Fitbit is a wireless accelerometer device that Participants wear on their body. The Fitbit device collects data and computes measures for physical activity, such as steps taken, distance moved each minute, or scoring quality of sleep. Fitbit devices are sold by a third party company, and that company provides a web service to store and manage Fitbit devices on a per user basis. That service also provides a public application programming interface (API) to be able to fetch the stored data and set configuration parameters for a specified device. The Platform 120 can manage the authentication credentials for each device, to fetch the Fitbit data through the API and correlate with the correct Participant (such as Participant 140). Example configuration parameters for each device can include, 1) sensitivity level of the sensor on the device, and 2) a goal for number of steps taken per day. The code encapsulated in the Extension for this Instrument contains the software components to interact with the Fitbit company's API, to retrieve data for devices and set configuration parameters.

The Participant device manager component 126 interacts with the other components of the Platform 120 and the Extensions 130 to provide an interface to the software and hardware used directly by the Participant (e.g., the Participant 140). This relationship could be established with direct communication, or established with indirect communication through a third party system (e.g., as shown in scenarios 940, 950 in FIG. 9).

Participants interface with a mobile app or sensor, either actively or passively, according to the Protocol that the Participants are assigned by the Investigator. Using the Settings set by the Template for that Instrument, the device will collect data using sensors or data input by a Participant. That data is then uploaded to the Platform 120 or a third party server where the data is stored and linked to the Participant.

Wireless sensor devices and smart device applications are increasingly being used to monitor and intervene on health and wellness behaviors during daily life. These include wearable sensors, sensors that reside in consumer's homes and workplaces, and applications that are installed on their personal smart devices. Often, these devices are purchased and configured by the consumer directly, and data is gathered and managed on their own. However, for assessments or interventions that utilize these devices and apps which are coordinated and managed by a third party such as a clinician, researcher, wellness coach or their respective teams, another layer of configuration and management is useful.

A deployable Template can include the settings and configuration options for the devices and apps that determine data collection and intervention delivery, such as settings that need to be established and managed for each user. It commonly is desired for these settings and options to change over time, as determined by the Coordinator rather than the end user. In accordance with the techniques described herein, Coordinators are able to define, use, and re-use a deployment Template for one or a plurality of Projects, in one or a plurality of research studies.

In particular, the use of a deployment Template enables assessments and interventions where a defined schedule and Protocol are known, and it is desired to manage user devices and apps through a central, automated mechanism. Without a deployment Template mechanism, a typical flow to setup a Participant for a Protocol that includes two Instruments would involve the Coordinator accessing websites for each of those Instruments individually, and set up an initial configuration for each Participant. Then, at each stage of the Project where the configuration settings for a Participant Instrument should be updated, the Coordinator would again access the Instrument website directly and update the configuration for each Participant.

Some examples of the type of mHealth Instruments that can be integrated with the Platform are PiLR EMA and other mobile applications for reporting/recording/evaluating dietary intake, food inventories, and reporting on smoking/drinking/pain episodes, sleep quality, exercise; mEMA by Ilumivu; and Actigraph, GENEActiv, Gruve, and Fitbit devices. The following examples provide additional detail on the use of these and other mHealth Instruments in connection with the presently described Template system. An overview of the applications of mHealth and related Systems Science is provided in the publication to Oreskovic et al., "Integrating mHealth and Systems Science: A Combination Approach to Prevent and Treat Chronic Health Conditions," Journal of Medical Internet Research mHealth and uHealth, vol. 3, issue 2 (2015), which is incorporated by reference herein in its entirety. It will be understood, however, that similar techniques can be applied in connection with additional types of Instruments and activities.

EMA Protocol Builder

In one example, the Platform integrates with an "EMA Protocol Builder". The EMA Protocol Builder serves as an Instrument configuration component that allows a user to setup an EMA Protocol through a user interface (such as a website), without programming, and having that EMA Protocol deployed to Participants' mobile apps.

FIG. 2A illustrates a wireframe of a configuration user interface 200 of a PiLR EMA Instrument that a Configurator can use to setup a complex set of surveys, messages, delivery logic, and scheduling for a Project. The Configurator can start by adding independent components for the Protocol, which includes self-report events, surveys, and messages. These components are created or edited through forms on the first three tabs, respectively. Self-report events are events that will appear as selectable on the mobile app on the Participant's device, such as in a list. The Participant can view the list of available self-report events and select one of them. The selecting of an event is logged, and can be used to trigger an action (described later).

Likewise, FIG. 2B illustrates a screenshot of a graphical user interface 250 used to further configure surveys and trigger criteria to collect information. As shown, various actions specifying survey interfaces, trigger criteria, and mobile application interfaces may be performed within the graphical user interface. For example, surveys may be designed in the graphical user interface to be delivered to participations through a mobile app for a mobile device, as participants are prompted to take a survey through a notification on the mobile device. The surveys may be presented as a result of a self-report event, or triggered from an event that is specified. Also for example, trigger criteria, which are the components used to describe the how, when, and what of getting information from the participants, may be defined in the graphical user interface. Various other options may be defined in the graphical user interface to specify and setup the conditions for triggers and accompanying actions.

Creating surveys includes creating questions to be asked of the Participant through the mobile app. These questions can take various formats, such as multiple choice, radio options, free text input, number response, photo response, or voice recording response. Arranging questions into an order and configuring delivery logic such as showing or hiding questions based on previous answers, results in the definition of a survey. The Configurator can create one or multiple surveys to be delivered to the Participant as an action of a task. Messages are text or image content that should be presented to the Participant as an action when information should be given, but a survey is not required.

Once the content is created, the Configurator can create Task elements to link triggers to actions in a many-to-many relationship. A task is a defined set of many-to-many relationships of triggers to actions. Within a task, the triggers and actions act as an "if this happens (trigger), then do that (action)". If any one of the triggers specified in a task occurs, an instance of that task will be generated, and all of the actions in that task will be performed. Triggers can be one of a variety of types supported by the smartphone or sensor technology that is acting as an Instrument. Examples of types of triggers are a) at a specified or bounded random time, b) at a specified or bounded random time repeating on specified days of the week for a specified duration, c) when the Participant selects a self-report event, d) when the Participant arrives or leaves a specified location, e) when the Participant has been active or sedentary for a long enough time such that a specified duration threshold is reached. The trigger type mechanism is used to make the list of options expandable to new types. In further examples, triggers may include one or more variations of conditions based on: time, motion, location, sound, temperature, or proximity (e.g., a child being in the same room as a parent/caregiver or within 25 m of a store that sells tobacco products).

Additionally, the Configurator can specify delivery logic between triggers for more complex protocols. For example, if a task has two triggers specified of 1) when the Participant arrives at work in the morning, and 2) at 10 am each weekday, the Configurator could add logic to that task so that only one of those triggers can start the actions per day, meaning the trigger that happens first will occur, and the other will then be ignored until the next day.

Actions are the components of the task that will be started when a trigger occurs. Examples of actions are a) delivery of a specified survey to the Participant, b) delivery of a specified message to the Participant, c) logging of the Participant's location, d) start logging the Participant's physical activity through a sensor, e) sending a message to the Coordinator of the Project. The many-to-many relationship between available triggers and actions within a task provides the Configurator with the flexibility to create components of a Protocol specific to their Program.

With tasks defined, the Configurator then can group sets of tasks needed to implement a particular Protocol into a configuration bundle. A configuration bundle contains all the information needed to deliver a configured Protocol to a Participant over a given time period. The Configurator can define one or multiple configuration bundles for a Project, which then can be specified by Templates to use over Period Epochs. Which configuration to use for an epoch within a Template would be specified just like an Instrument Setting is specified, where the Configurator selects an epoch and then specifies a configuration bundle from the dropdown list of those available.

This simplifies deployment by allowing a Configurator to define the possible configuration bundles, and create a defined set of Templates for Participants to be deployed from. This also specifies which Protocol that the Participants will receive, so then when the Coordinator deploys a Participant from a Template, and the entire EMA configuration will be ready to use. When the mobile app for a Participant device syncs with the Platform, the API will return the information for the appropriate configuration bundle that they have been assigned to receive, based on the Template they were deployed from.

Deployment Templates

In connection with operation of the Platform described herein, a deployment Template can be defined and utilized. A deployment Template provides functionality for use as a pre-defined configuration Template that specifies, for example:

1. Instruments (newly created or selected) that will be or were used over a period.
2. The relative date and/or time schedule for epochs within a period, specified as start and end days after period start.
3. For the active Instruments, values of Instrument settings, specified for each individual epoch in a period.
4. For Instruments with custom configuration options, a set of options specified per epoch within a period.
5. For Participants, a user can specify one or multiple Group Categories.

For a Project, a user can specify one or multiple deployment Templates linking to Project periods and Group Categories. Then, as Participants are added to the Project, and are ready to be scheduled for one of their "active assessment or intervention periods", the user can select a deployment Group Category and a period start date, and all the configuration options will be set for that Participant.

The goal of a deployment Template mechanism is to provide a simplified way for Project Coordinators to configure all the components, settings, and schedules needed to deliver an assessment or intervention to Participants through mobile apps or wireless devices. The use of the deployment Template accomplishes this by a) alleviating Coordinators from having to repeat the setup steps for each and every Participant, b) giving Coordinators the flexibility to have various scenarios pre-defined, and set up a Participant based on one of the pre-defined scenarios, and c) allow changes in settings over time to be updated automatically, rather than having to manually update the settings at the time that the settings need to change.

Additionally, the Platform provides a mechanism for the Coordinator to generate one or multiple deployment Templates for a Group Category within a Project. When deploying a Program to a Participant, the Coordinator can select the Group Category to use, and all the configuration and setting options for the Program will be populated for that Participant.

Figure 3:
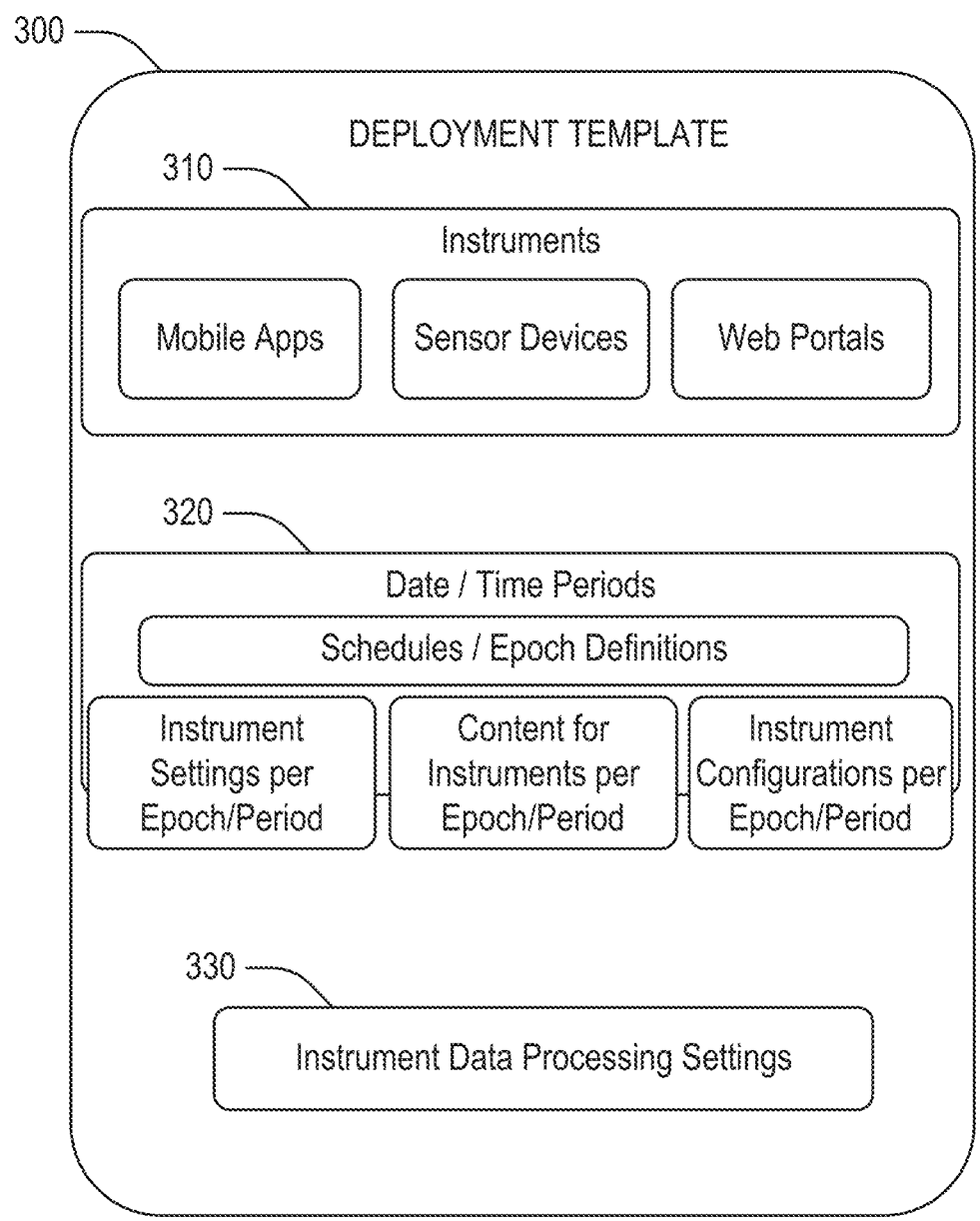
FIG. 3 illustrates an overview of the components of a deployable template according to an example described herein.

FIG. 3 provides an illustration of operational components, data attributes, and data fields defined for a deployment Template 300, according to one example. Each deployment Template can be configured to define, for example:

Mobile apps, sensor devices, or web portals (Instruments 310) that will be used by the Participant.

Relative date schedules for the time periods 320 in which the assessment or intervention will be delivered, including epochs within that Active period where settings or content can change.

Values of Instrument settings 330, specified for each individual epoch in a period.

Assessment/intervention content for Instruments for each epoch within a period.

Data processing or handling to run as data is received from Instruments. This could include validation, cleaning, post-processing or analysis, or training of machine learning algorithms.

Configuration values for analysis tools to use when analyzing collected data, for each epoch within a period.

The Coordinator can specify a 'relative schedule' for the Template rather than concrete dates, because each Participant can start on a different date, but follow the same schedule after that (such as 1 month of a first thing, followed by 2 months of a second thing, and so on). Other types of time customizations can be established in connection with schedules and time/date period definitions.

Figure 4A:
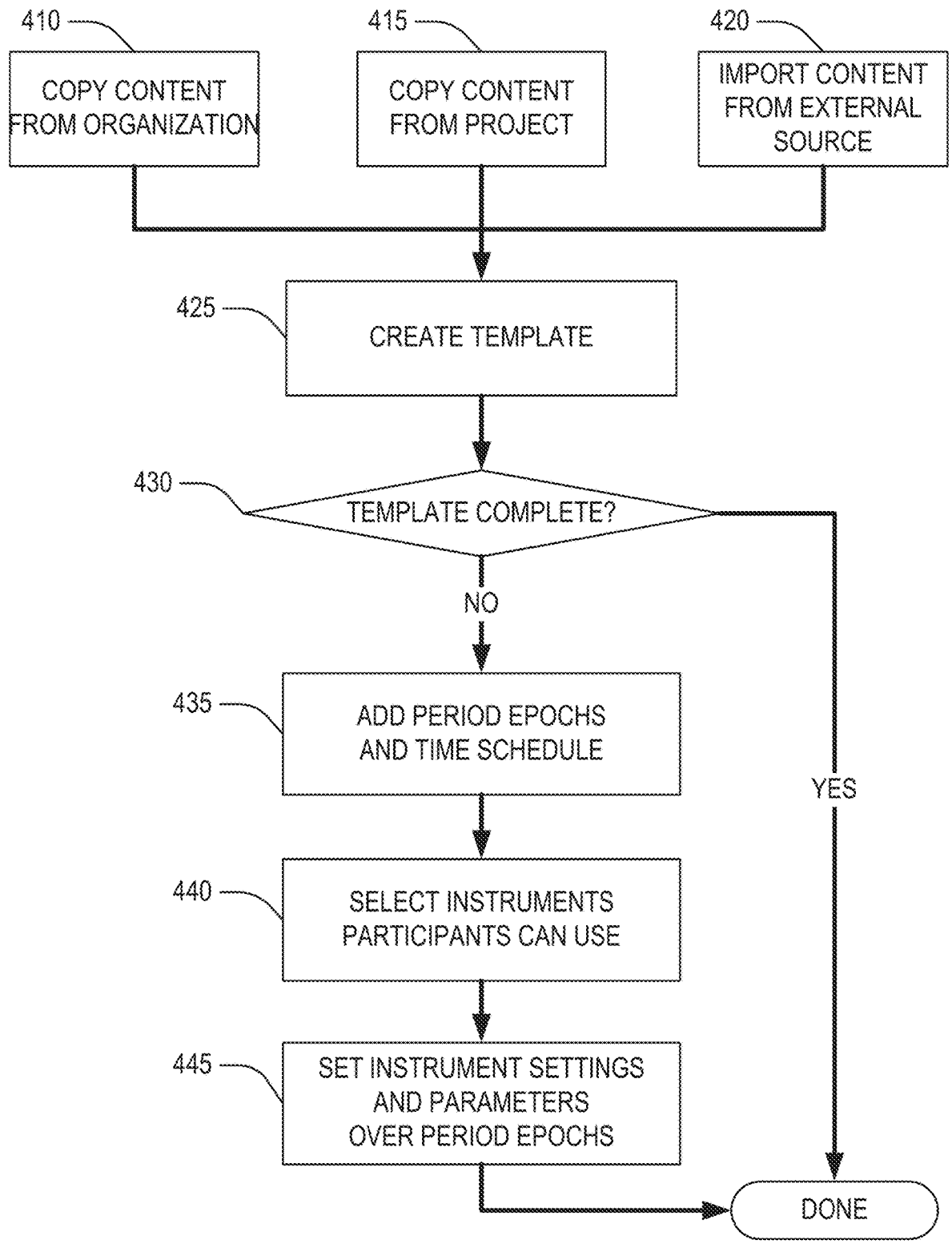
FIGS. 4A and 4B illustrate flowcharts of operations to setup a deployment template and study participant usage of a deployment template according to examples described herein.
Figure 4B:
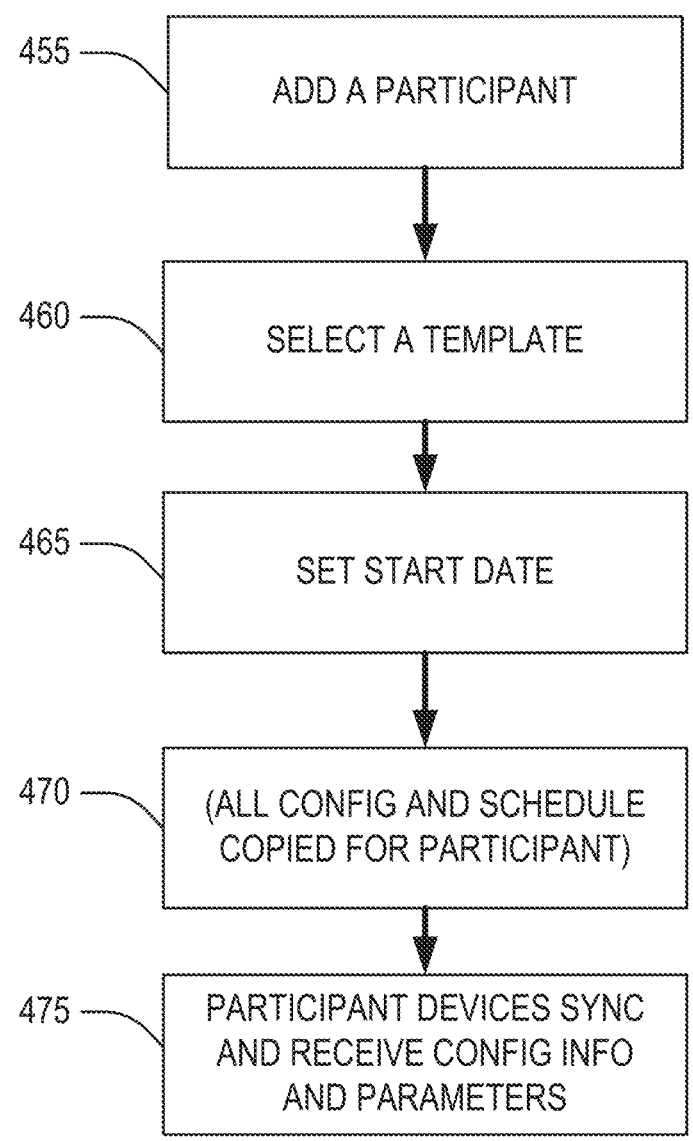

FIG. 4A depicts a flow diagram of the process that a Configurator can perform to set up a deployment Template, and FIG. 4B depicts a flow diagram of the process that a Coordinator can perform to deploy a Participant into a Program, specifying the Group Category. (Note that these tasks could be done by the same person, although the tasks can be differentiated here by role.)

As shown in FIG. 4A, various content may be copied or imported for a Template. For example, content may be copied from an organization (operation 410), copied from a project (operation 415), or imported from an external source (operation 420). For a representative first use of the system, a Configurator creates a Template for the Project within the Organization (operation 425) based on this copied or imported content. If the template is complete or the default template in for the Organization contains all needed elements (as a result of determination 430), actions are complete. If the template is not complete (as a result of determination 430), further actions may be performed to set the options for the Template according to a Protocol. This includes the time epochs where configuration settings for the Instruments can change automatically, and a schedule for those epochs specified by a duration in days and an offset from the period start date (operation 435). Epochs in the period cannot overlap, because Instrument settings are set per epoch. The Configurator also selects which Instruments will be used for Participants that deploy from this Template (operation 440), and sets the settings for the Instrument for each of the epochs that were created (operation 445). The Configurator can also create one or more Group Categories for the purpose of dividing the study Participants into distinct groups for analysis. Templates are assigned to the Group Categories. In subsequent uses, the Configurator can use the copy, export, and import functions to create new Templates by reusing existing ones from the Organization, or from other Projects. Thus, it is possible for this Organization, to import Templates from other Organizations, or external sources, which can simplify setup for even the initial Project.

Once one or multiple Templates have been created for a Project, a Coordinator is then able to deploy Participants into the Program to follow a Protocol by selecting one of Group Categories. FIG. 4B depicts this flow. When a Template is selected for an individual participant (operations 455, 460), the Coordinator will select a start date for the Participant's Program to begin (operation 460). Based on that start date and the epoch schedule outlined by the Template, concrete dates are calculated and stored for each epoch for that individual Participant. The configuration options are copied from the Template to that Participant's configuration options (operation 470). Once those steps are completed, the Platform is ready to send that configuration information to the Instrument devices through a "sync" process, and also receive and store data collected by the devices and transferred over the Internet (operation 475). Further, any third party "back-end" software components that interface with the Instrument to push data to or handle data from the Instrument devices can also be configured as needed. This relationship requires the Platform to actively send requests to an API of the third party system to set parameters specific to their system.

FIGS. 5A, 5B, 5C, and 5D depicts an Entity Relationship model diagram for one manifestation of the Platform objects used to manage deployment Templates. These objects are created and managed by the Platform to configure and coordinate Participant deployment information. All configuration options can be established under a single Project (as shown in model 510 in FIG. 5A), and therefore a Project is the primary unit of organization, both in terms of application logic and also in terms of data storage. Participant data that is generated throughout the course of a Project is collected by a device (as shown in model 530 in FIG. 5C).

Devices, for example, can be the physical hardware that the Participants wear or otherwise interact with throughout the course of a Project, and each unique physical device can be referenced as a logic device object by a unique ID such as a serial number. (An example of a Participant device would be a Fitbit Flex, a smartphone, or a respiration calorimeter.) The configurable device is assigned to a Participant, and linked to an Instrument on the Platform (as shown in model 540 in FIG. 5D). Data from these devices is collected and stored in the Platform. In addition to facilitating ingress or acquisition of this data, the Platform components are used to analyze, manage, and display the data in ways that are most useful to investigators.

Figure 5A:
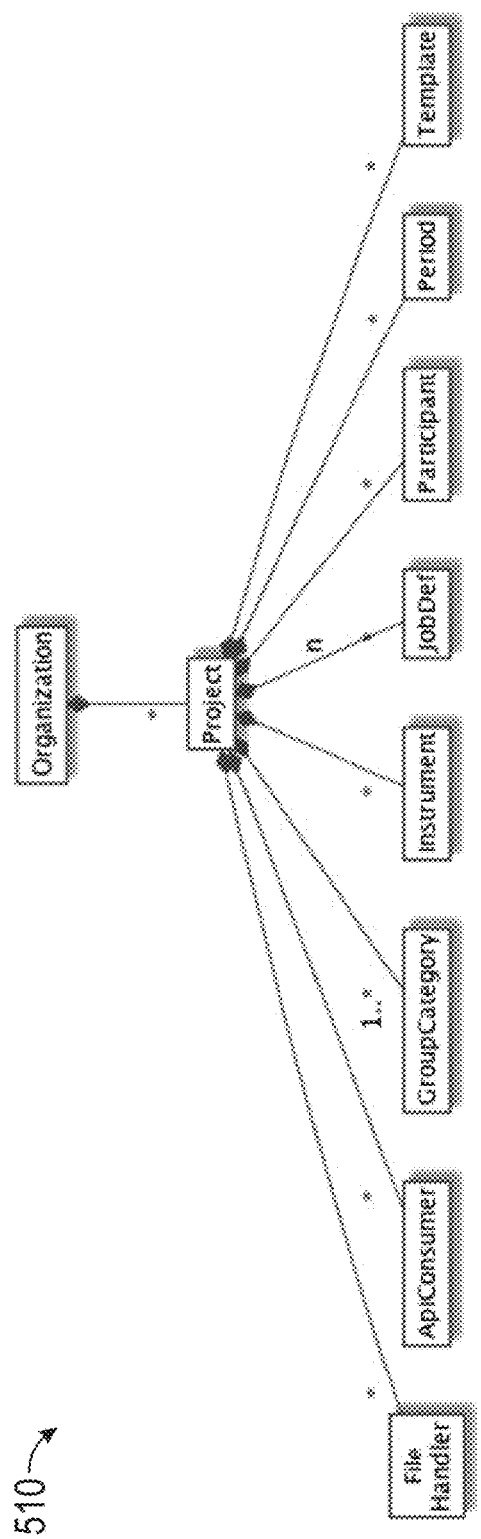
FIGS. 5A, 5B, 5C and 5D illustrate entity relationship models of objects used to create and coordinate participant information in connection with using a deployment template according to an example described herein.
Figure 5B:
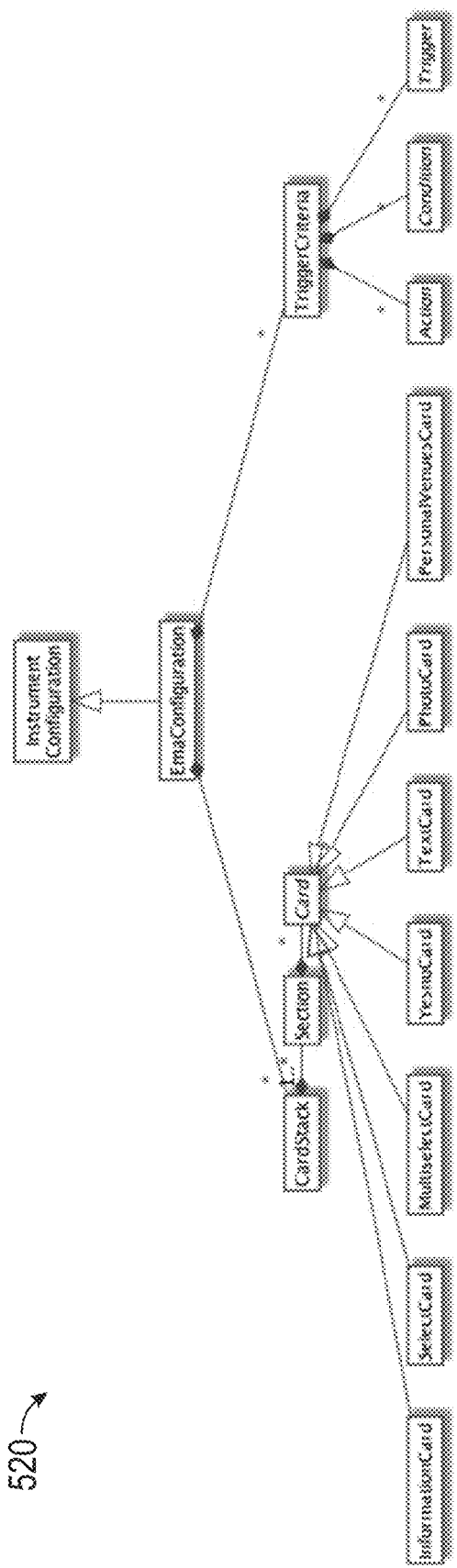
Figure 5C:
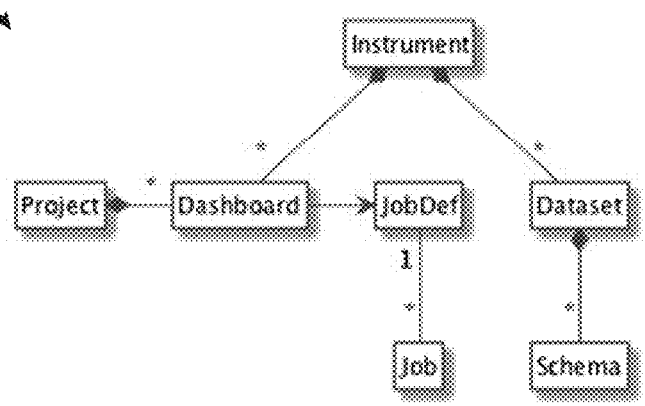
Figure 5D:
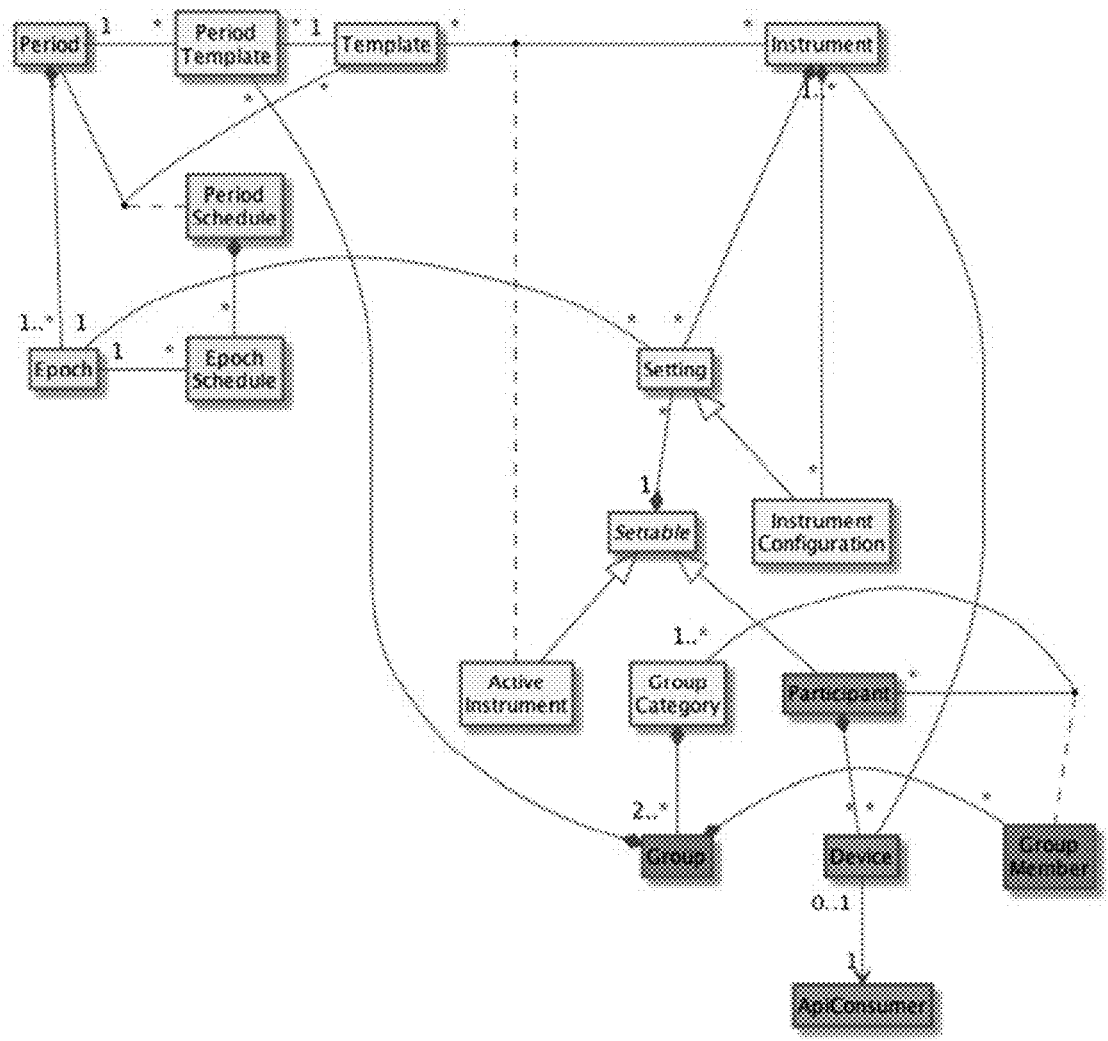

The Participant's device, or the software for the Instrument on a device will have configuration options that need to be set and changed over time according to a Protocol, and these configuration options are referred to as Instrument settings, or generally Settings (as shown in model 520 in FIG. 5B). Without the deployment Template mechanism, Coordinators would need to set these Settings for each Participant individually, and update the Settings manually over time. For example, if the device should record data once per half hour for one week and then change to once per hour for the next week, this change would be implemented by updating the corresponding Instrument setting over two specified epochs. As a result of this change, any Participant deployed from a Template using this setting will be associated with the updated value. For a large number of Participants, it is most common to have a much smaller number of Protocol configurations, and thus much time can be saved by deploying multiple Participants from a single Template. However, it is possible to customize any Instrument Setting by Participant.

Once a Participant has been deployed from a Template, all Setting values are copied for that Participant. Thus, any updates to a Template after a Participant has been deployed will not affect those Participant Settings. A batch update process could be applied to simplify updating multiple Settings, but logically the stored values would be separated.

Projects are divided based on time into one or more Periods, which can, in turn, be split into one or more Epochs. For each Participant who is active during a Period, Settings are specified for each Epoch within that Period.

Group Categories can be defined to provide more assistance in scheduling when the configuration options should be set. Once Group Categories are defined for a Project, a Configurator can specify from which Templates the Participants in those groups should be deployed. Participants in these groups can be scheduled with a different Template for each Project period, thereby allowing the Coordinator to add a Participant as a member of a group and have the Participant be scheduled to deploy from the proper Templates over multiple Project Periods.

Additionally, all logical entities described herein (Projects, Settings, Instruments, Templates, etc.) can be serialized as a definition which, in the context of importing or exporting, is, for example, a JSON representation of the object. These definitions can all be imported into the application as part of a Project or separately where applicable. The Project import/export feature can be used as a simple way to migrate all aspects of a Project from one system to another, for backup/restore operations, to support diagnosis/troubleshooting, and as a means to ensure modularity and portability of the individual application components, as well as the Project overall.

FIG. 6A depicts a wireframe of an example user interface 600 that a Configurator can use to setup a deployment Template. This user interface allows the Configurator to specify a Project period with a sequence and duration of epochs. Once specified, the Template can be used to deploy a Participant for the specified Period. The Configurator can also specify which Instruments (sensor devices or apps) the Participants will use if deployed from that Template, and the Settings for those Instruments over each epoch.

Likewise, FIG. 6B depicts a screenshot of a graphical user interface 650 used to further configure a deployment Template. As shown, various actions for viewing and editing a Participant deployment Template may be provided, based on schedules, Instruments, and Instrument settings, with accompanying actions to modify and change the deployment Template. For example, a scheduling user interface control may be used to specify project periods the Template can be used for, including specifying start and end days of each epoch relative to the start of the period. (The actual calendar dates of epochs can be set at the time that a Participant is deployed from the Template.) Also for example, an Instrument settings user interface control may be used to specify Instrument settings for each period, or to leave the settings in the Template to default values. (Instrument settings can be copied to a particular Participant at the time that the Participant's period is scheduled.)

The ability to divide Project periods into discrete configurable epochs is an important prerequisite of managing research studies. Therefore, the epoch management features described herein is an important aspect of the Platform and its underlying logical structure. At its most basic, an epoch is simply a measure of time, within which some configuration value(s) remain constant, or take on a given behavior. Thus it is the transition between epochs at which such configuration values change.

For example, one might configure epoch 1 with setting value A, and epoch 2 with setting value B. In this scenario, a researcher may be interested in detecting statistically significant differences between the data collected during epoch 1 and the data collected during epoch 2, thereby supporting or refuting a hypothesis of correlation between the mutated setting and some other quantifiable result which is to be observed in the collected data. Therefore, it is important that proper metadata is recorded during data collection to maintain a record of which epoch a piece of data belongs to, and the Platform can be implemented with this important distinction in mind. This example, while by no means an exhaustive description of the utility of epochs, demonstrates the importance of epochs with regard to the collection and analysis of data, and also the close relationship between epochs and configuration values.

Epochs can be configured with a relative timeline which takes the form of an integer start day, e.g., "3", and an integer end day, e.g., "7". If an epoch is configured with start day 3 and end day 7, this constitutes an epoch lasting four days, starting three days after the beginning of the period it is associated with. Periods can have as many epochs as are necessary, each with its settings. Settings within an epoch can be configured for individual Participants or the settings can be configured for the Project overall. This makes it easy to apply settings to a large number of Participants at once, while giving the flexibility for individual customization. Similarly it is possible to configure settings such that the settings do not take on any value at all, in which case the setting is said to be "not-specified". A setting can be unspecified by default, or only be specified in certain cases as needed by epoch/Participant. It is also possible to configure a setting as unspecified in certain edge cases when it has an explicit value by default.

Settings and epoch configuration values can be persisted separately from the deployment Templates, and can be maintained intact even if the Template (or epochs/settings therein) changes after the Participant has been deployed. Thus it is possible for Templates to evolve as needed without affecting previous Participants, epochs, and settings which have been deployed using the Template.

The Settings for an Instrument often will correspond to more complex sets of configuration information for an Instrument. Having the Settings be specified as a single value for scheduling each epoch, however, simplifies the management of the Templates. For example, for an Instrument that is a smartphone application that delivers survey questions to Participants through a mobile app on their smartphone, a Setting could correspond to a whole set of survey questions, delivery logic, and a delivery schedule. A Configurator would bundle all these configuration options into a unit and the Setting value would simply reference that bundled unit. Then, when the device syncs to retrieve the configuration information, the Extension is passed the Setting value for that Participant and Epoch and it can return the proper configuration information.

For example, as illustrated in the interfaces 600, 650 of FIGS. 6A and 6B:

1) When a period is specified for a Template, the Template can set the relative offset and duration values for each epoch.

2) When a period is linked to the Template, the Template can set setting values for each epoch.

Once one or multiple Templates have been set up by a Configurator, a Coordinator can use a user interface such as that depicted by the wireframe of FIG. 7 to view the Settings for all of the Templates, and preview what Settings would be copied to a Participant if they were deployed from that Template. For example, FIG. 7 illustrates an example of an interface 700 used to provide the Coordinators with information about the Templates prior to deploying a Participant from one.

In principle, Settings can be any discrete or continuous variable for which a value can be quantified and tracked within the context of an epoch. In one implementation, a Groovy base class defines abstract and default behaviors and properties for all Settings, and is extended by various subclasses which define behavior and properties of specific kinds of Settings. Subclasses can be of arbitrary type and can include Integer, Boolean, Double, Enumeration, Time, Date, String, and Configuration settings. Settings can be specific to Instruments (Instrument Settings) or specific to Participants ("Participant Variables" or Participant Settings). Settings can be defined by a "definition" which is a JSON representation of the properties and values that make up the setting.

Settings can be imported and exported in conjunction with another entity or individually. For example, an Instrument has explicit associations with various settings, so when an Instrument definition (also a JSON representation) is imported into or exported from the system, it contains the definition of its corresponding Instrument settings. Additional settings can be added to an Instrument, for example, via the application interfaces or manually by modifying the JSON definition in a text editor or graphical editing tool. Manually editing a JSON definition may have the same effect as does performing the corresponding changes via the application, and vice versa.

The JSON representation of a Template contains the JSON representation of all associated settings. Setting definitions contain a 'clazz' property which specifies the setting's subclass and is used to instantiate the setting as a Groovy object for use in the application, thereby bridging the gap between the serializable JSON representations and the Groovy representation that can be executed by the application.

Deployment is the process of copying settings from a Template to a Participant record. During deployment, all settings corresponding to the Template from which a Participant is being deployed are copied to the Participant's database record and stored independently of the Template. The reason for deploying a Participant from a Template (rather than simply maintaining a relationship or foreign key) is to ensure that the Participant record is not affected by alteration of the Template after it has been deployed. Thus, subsequent modification or deletion of the Template does not adversely impact Participants that are already submitting data.

When the Coordinator wants to deploy the Participant, the Coordinator can select a period and a list of available Templates will show, along with a picker to select the start date of that period for the Participant. This is depicted in FIG. 8A. Once the Template and start date are submitted, the Epoch dates are calculated and the settings are set for that Participant.

Figure 8B:
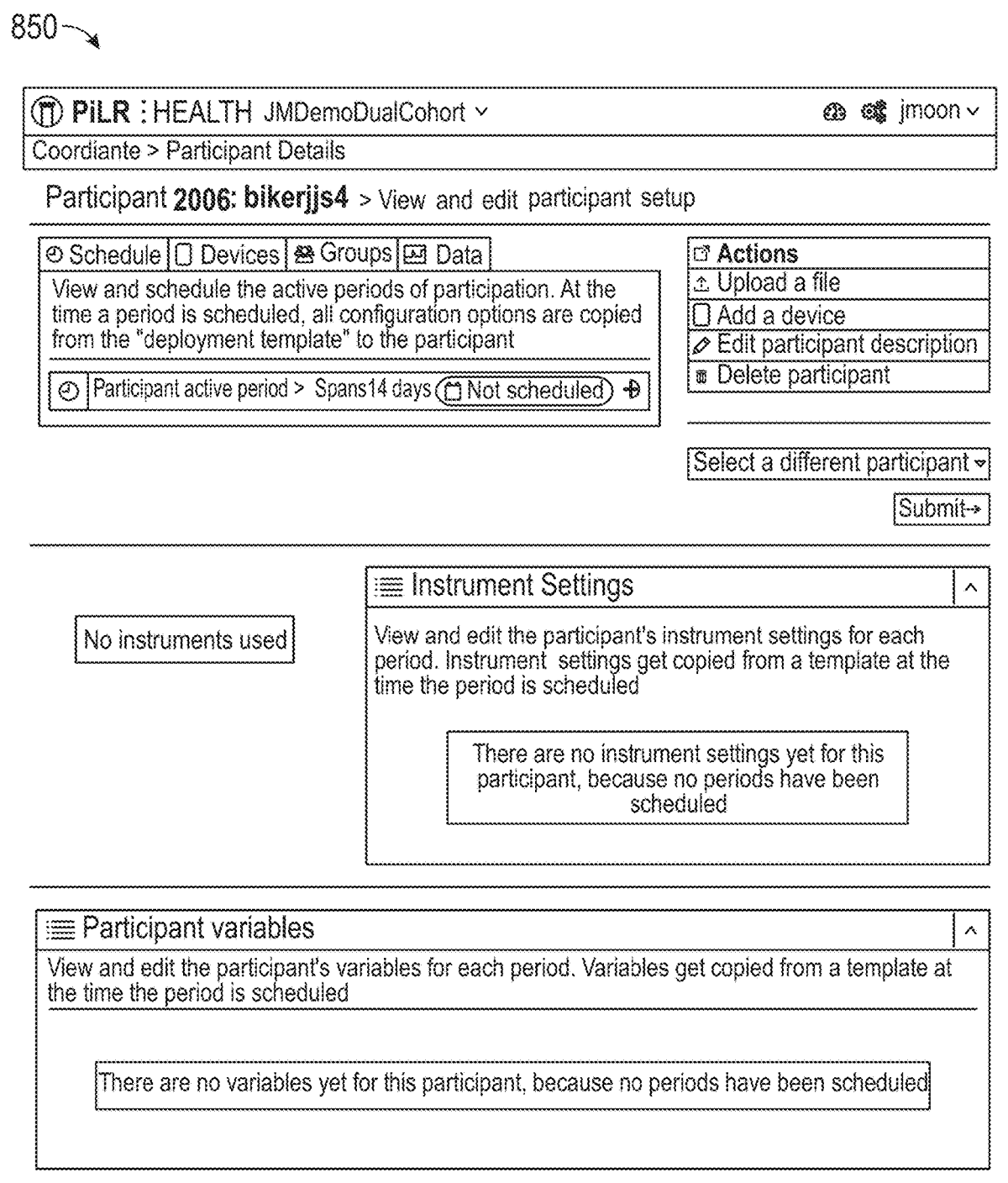

FIG. 8A illustrates a graphical user interface 800 that includes a number of configurable settings for deployment of a Template to a particular Participant. The settings for deployment of a Template in the graphical user interface 800 can include a configurable schedule, Instrument settings, Participant variables/settings, groups, and devices. FIG. 8B further illustrates a graphical user interface 850 that includes additional configurable settings to deploy a Template to a particular Participant, including a user interface control to view and schedule modifications to the configurable schedule, a user interface control to view and edit the Instrument settings for a particular Participant, and a user interface control to view and edit the Participant variables for each period. (Consistent with the techniques previously described, configuration options, instrument settings, and variables can be copied from the deployment Template to the Participant at the time a period is scheduled.)

Whereas the relative epoch schedule on the Template can be an integer start day and an integer end day (e.g., start day 3 and end day 7 would be a four-day epoch), the epoch start and end dates are converted to concrete calendar days when the Participant is deployed and the settings are stored in the Participant record. It is advantageous to use relative days within the context of a Template because the Template can be used to deploy and redeploy many Participants over a long period of time, and as such using specific calendar days on the Template would involve continually updating the start and end days each time a Participant is deployed. This tedium is avoided by using relative start and end days on the Template, and converting the relative days to calendar days during deployment.

Selecting the "Save" option in the user interfaces of FIG. 8A, for example, proceeds with deployment, calculating epoch start and end dates based on a combination of the deployment start date and relative epoch schedule. If the epoch's relative start day is 3, and a Participant has a deployment start date September 2019, then the epoch is copied to that Participant's database record with start date of September 2022.

In one example, Platform servers may operate as Debian-based Linux machines running Tomcat, MongoDB and Grails serving REST/JSON APIs and rich user interfaces. Data analysis runs on OpenCPU. RabbitMQ can be used for messaging. Application interfaces are Grails views augmented with AngularJS. Ansible can be used for configuration management. Mobile applications can be created with Titanium and interface with the server via REST/JSON API. Data can alternatively be ingressed via CSV files based on predefined parsing formats.

Figure 9:
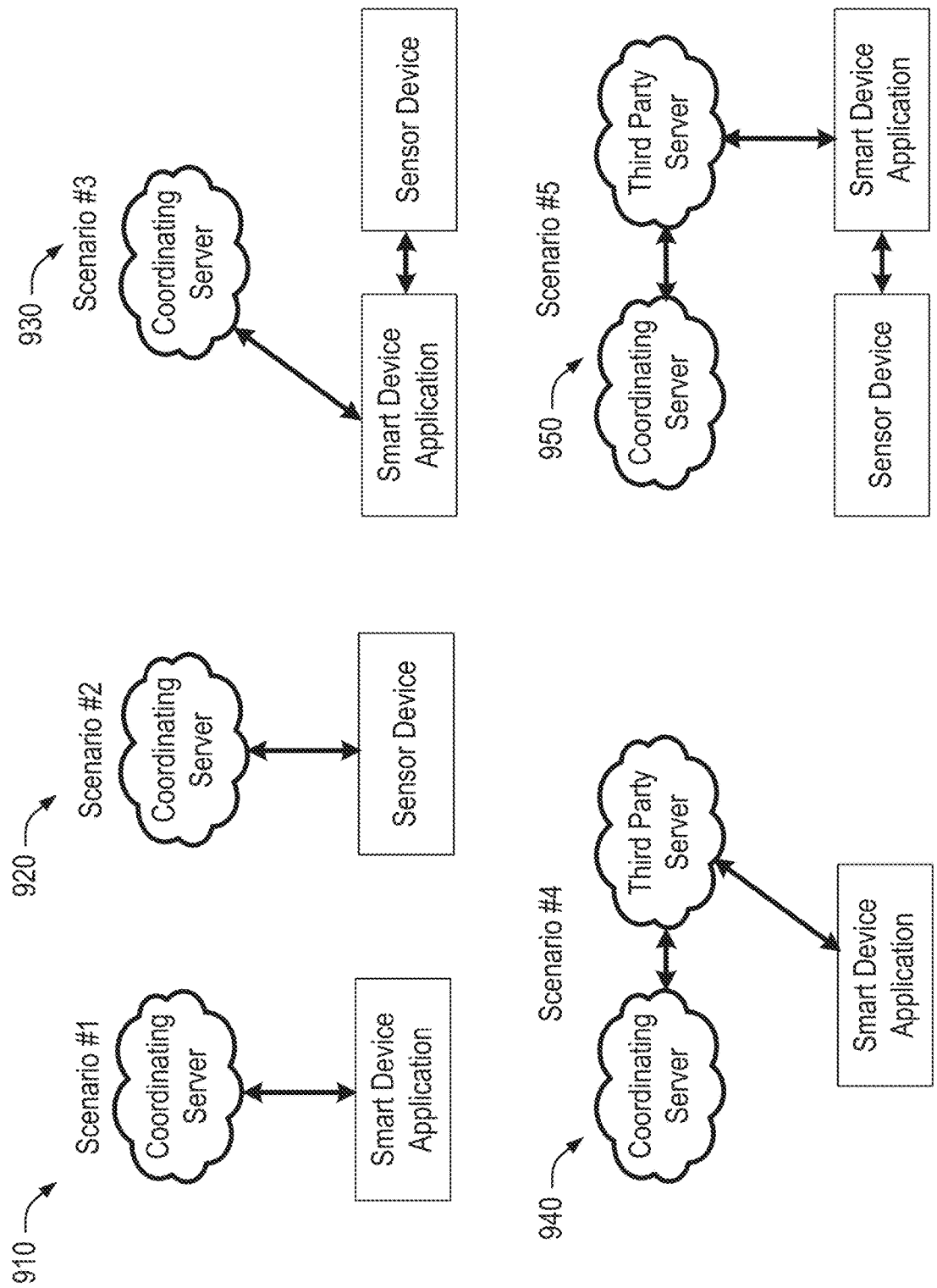
FIG. 9 illustrates communication diagrams between systems and devices for a research study according to examples described herein.

FIG. 9 illustrates several common scenarios 910, 920, 930, 940, 950 of the interaction between the Platform (coordinating server), smart devices and sensor devices, and third party servers. Within the Platform (in the Participant device manager component) the REST API and Push Controller are the two components responsible for interfacing with the Instrument devices and third party servers (which then interface with their device). For example, the REST API can handle authenticated requests over a secure transport protocol (e.g., HTTPS) for the configuration data, and returns the appropriate configuration data based on the Participant and device requesting the configuration data and based on the time the configuration data is requested. The REST API fetches the appropriate configuration data from the database by checking the epoch schedule for that Participant, and then fetching the configuration data for that epoch. If the device requesting the configuration data can handle storing and automatic changing of configuration over epochs on its own, the REST API can also return all the epoch times and configuration data sets all at once. However, a more common scenario is that the device or third party server is designed to store only a single 'current' configuration data, and updates are achieved by periodically requesting the configuration data from the REST API, or by receiving a "push notification" from the push controller telling the REST API to update the configuration data.

In the depicted scenarios of FIG. 9, the "Coordinating Server" refers to the Platform server that hosts the project coordination manager component. In an example, FIG. 9 shows the simplest scenarios 910 and 920, where the smart device or sensor device are communicating directly with the Coordinating server, respectively. An example of this communication is an REST API with secure (HTTPS) transport. In an example, FIG. 9 also shows a scenario 930 where a sensor device must connect with a smart device (e.g. over a Bluetooth connection), and then the smart devices connects to the server to send/receive the data or configuration parameters. In an example, FIG. 9 also shows a scenario 940 where an app on a smart device would connect to a third party server that has an API that enables the Coordinating server to fetch or receive data from it. In an example, FIG. 9 also shows a scenario 950 where a sensor device connects to a smart device app, which then connects with a third party server, when provides an API to send/receive data with the Coordinating server.

The Push Controller is the component responsible for (a) notifying the devices or third party servers that the devices or servers need to update the configuration data through the REST API, or (b) implementing a set of requests to the devices or third party API to set the configuration options. Scenario (a) is common for smart device application, where push notification mechanisms are readily available through the Platform. Scenario (b) is common if a sensor device or app interfaces with a third party server only to get configuration data, and the third party server provides an API that the Coordinating server can send requests to, to update the configuration.

In implementation, configuration data can be stored in JSON text format. JSON (JavaScript Object Notation) is a key-value pair specification that is common for sending data over a secured connection between components. The device or server that receives this configuration data interprets the content of the JSON text. The schema (fields and values) of the JSON data is different for each Instrument, so the code logic to build and interpret the JSON data is custom for each Instrument within the Extension.

Example Health Intervention Application

Health interventions that target a specific behavior when it occurs, or is about to occur, are significantly more successful than general education or even specific, but not timely, recommendations. For example, an effective obesity intervention can identify when adolescents are making meal choices during the school day and automatically send text messages that are culturally tailored and tailored to individual preferences in foods and venues. The presently described research Platform and deployment Templates can be deployed in connection with such a health intervention scenario.

Figure 10:
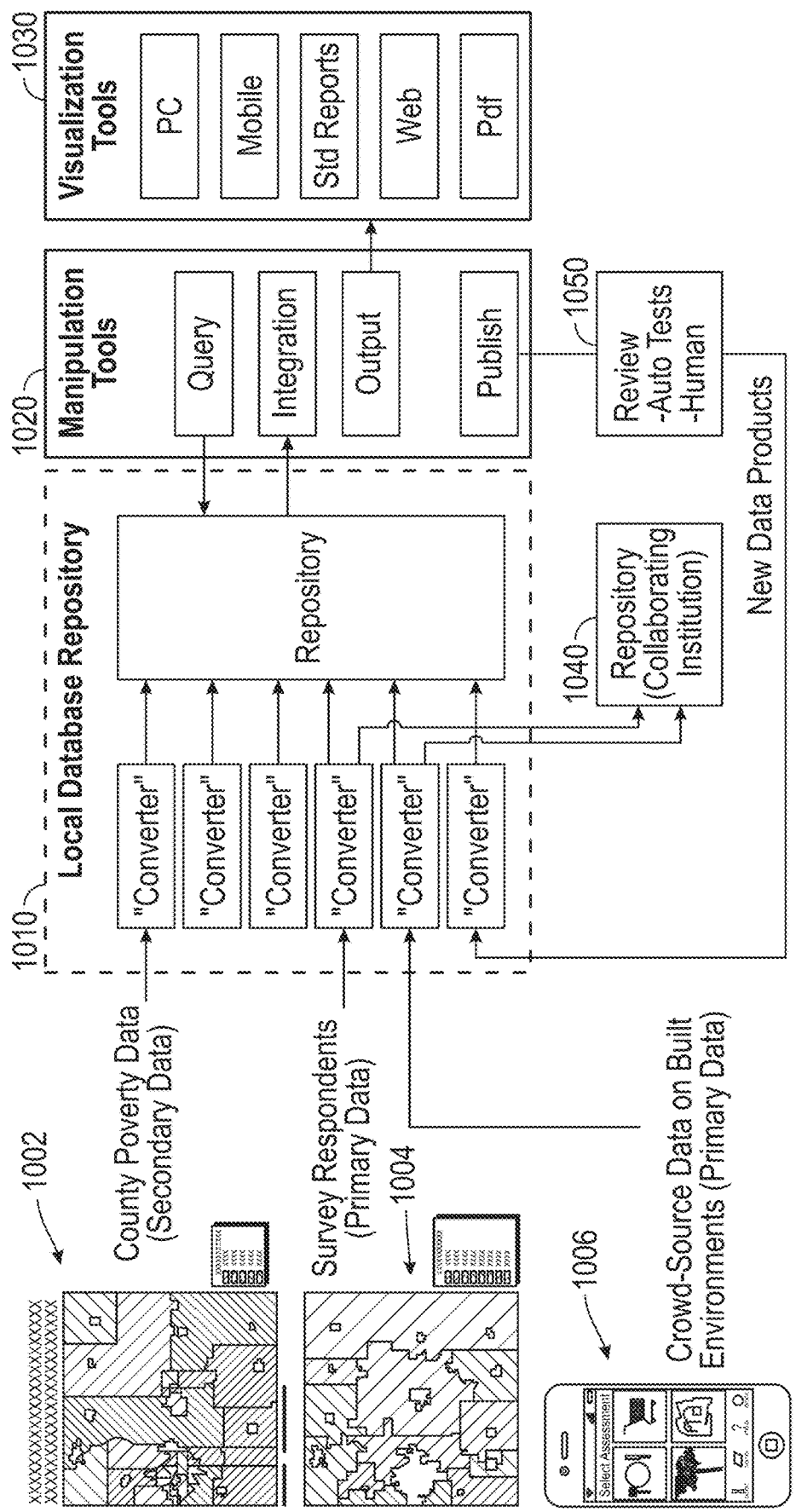
FIG. 10 illustrates the use of primary and secondary data sources in connection with a research study according to an example described herein.

FIG. 10 illustrates the use of primary and secondary data sources in connection with a research study. For example, as shown, functional entities of a system integrate primary data sources 1004, 1006 and a secondary data source 1002 into a repository system 1010. The data may be copied from the data sources 1002, 1004, 1006 into a single Template that provides functions such as: data acquisition and local storage (using converter and repository components in the repository 1010, which may output to a collaborating institution repository 1040), processing (using manipulation tools 1020, such as query, integration and output formatting) and visualization (using visualization tools 1030, such as providing output to a mobile device). Other features such as publication may facilitate review 1050 (including with human review or automated tests) for new data products fed back into the repository system 1010.

A representative Program aided by adaptive Templates, such as is depicted in connection with FIG. 10, can coordinate several components and activities:

1) A personal location information system (pLIS) that allows adolescents to register preferred and likely eating venues (cafeteria, fast food restaurant, convenience store) as they are encountered. The system would record and refine venue time/radius parameters to improve accuracy in predicting when the adolescent was in the venue with intention to eat.

2) After training the pLIS, the system will deliver tailored texts prior to users who are choosing foods based on information of preferences in food, message format, and other characteristics.

3) The adolescent can capture images of meals and other information providing feedback to the system on the timeliness and accuracy of the tailored texts in influencing their choices.

All of these configurations can be gathered into a general Template for the Program and redeployed for the benefit of another school or a different research project in another city. Or, a Template specific to one individual can be adapted to represent a group.

For example, a Coordinator (e.g., for a community coalition Project) may wish to compile a number of different data sources to support local health related programming. With previous techniques, the Coordinator had to visit a large number of websites and download the disparate databases. The Coordinator then searched to find appropriate data to extract, if it existed. With an integrated data Platform containing an adaptive Template already developed by a colleague, the Coordinator can focus on planning and evaluating the community's needs, submit more effective grants, and evaluation progress over time.

One Template that the Coordinator can choose may include Instruments to access just the data needed from the U.S. Census Bureau (e.g., racial make-up for a city because race has been shown to have a strong correlation to specific diseases), plus primary data on physical activity from a county community Health Needs Assessment that provides a representation on health indicators and health behaviors on residents, and a national database of metropolitan/micropolitan area risk trends that describes adult and youth nutrition (percentage of adults and youth that consume fruits and vegetables five or more times per day). The Template calls GIS and mapping visualization tools to overlay the demographic data on walkable routes in this city.

As a result, the Coordinator can use the system to generate and deploy survey volunteers who gather directed information to enrich the description of routes for factors that may be relevant to cancer incidence. The Coordinator then can save these surveys combined with the original data resources to a new Template and use this Template to repeat the data gathering and analysis six months later to gauge seasonal effects. Finally, the Coordinator can share a copy of the new Template with a colleague in another city who performs the same study. The two researchers can even create a third Template that coordinates analysis across their two data sets.

Example Methods and Computer System Operations

Figure 11A:
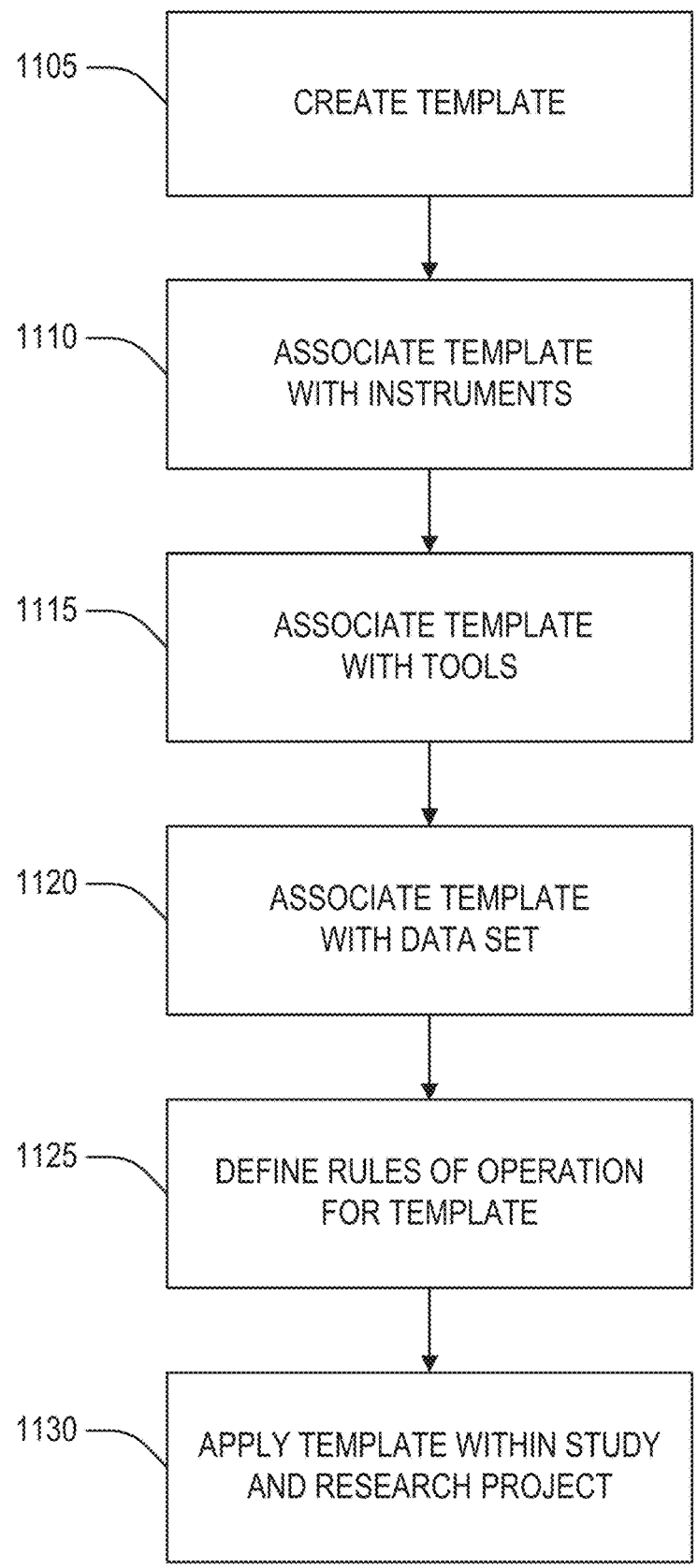
FIG. 11A illustrates a flowchart of a method for configuring a template in connection with a research study according to an example described herein.

FIG. 11A provides an example flowchart of a method for configuring a Template in connection with the research deployment scenarios described herein. As shown, the operations performed by the method are provided with reference to one Template within one study and research Project, but it will be understood that alternate (and additional) sequences and operations may be performed in connection with the method for the use and deployment of additional Templates, Projects, and studies.

As depicted, the method includes the creation of a Template (operation 1105). This Template is then associated with one or more Instruments (operation 1110), associated with one or more tools (operation 1115), and associated with one or more data sets (operation 1120). Further, rules of operation for the Template are defined (operation 1125). The Template and the associated data structures then may be deployed and applied within a particular study and research Project (operation 1130).

Figure 11B:
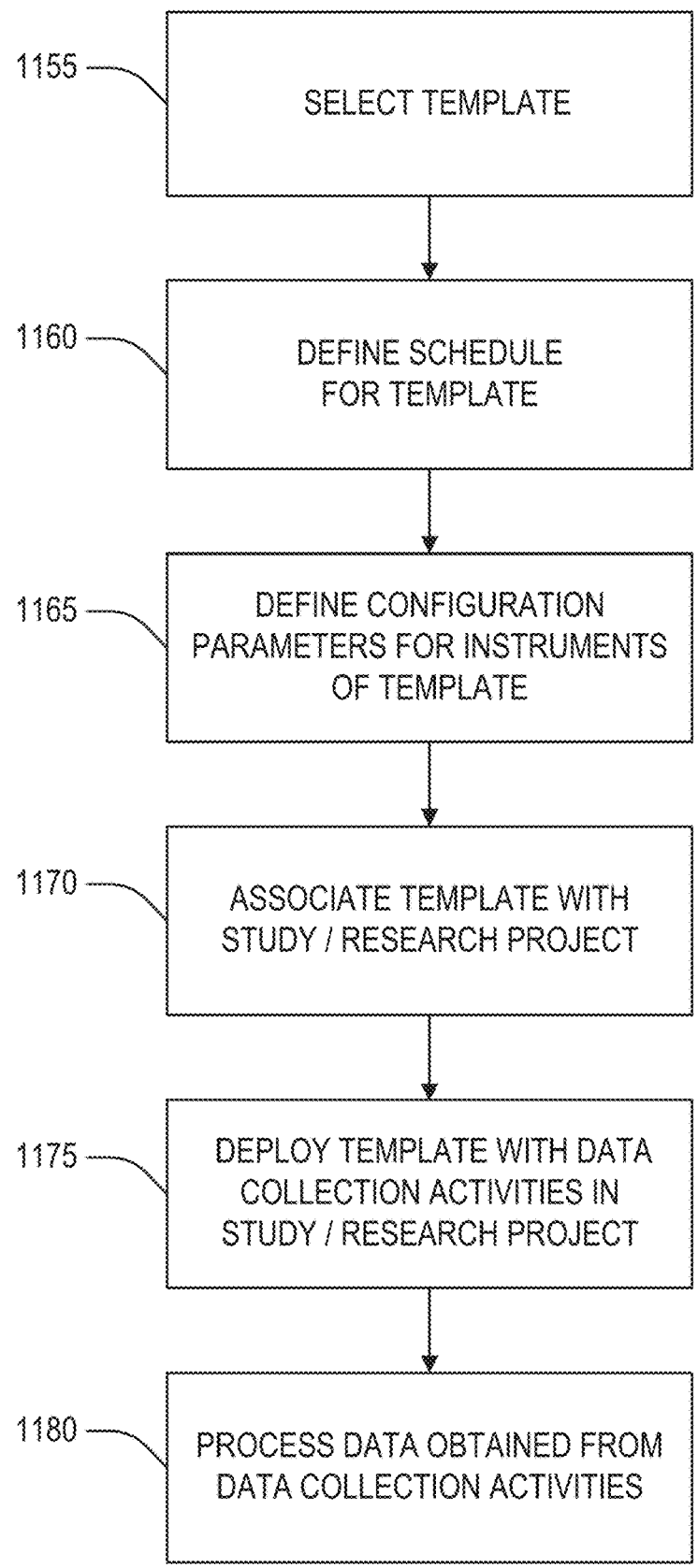
FIG. 11B illustrates a flowchart of a method for deploying a template in connection with a research study according to an example described herein.

FIG. 11B provides an example of a method for deploying a Template in connection with the research scenarios described herein. As shown, the operations performed by the method also are provided with reference to one Template within one study and research Project. But it will be understood that alternate (and additional) sequences and operations may be performed in connection with the method to use and deploy additional Templates, Projects, and studies, and Participant (individually or as groups).

As depicted, the method includes the selection of a deployment Template (operation 1155). The Template is then applied with particular data characteristics for a deployment. These data characteristics can include the definition of a schedule for the Template (operation 1160), the definition of configuration parameters for Instruments associated with the Template (operation 1165), and other data setup operations specific to the use of the Template. Next, the configured Template can be associated with a study or particular research Project (operation 1170), and the Template can be then deployed in connection with the Template-defined data collection activities in the study or particular research Project (operation 1175). The data collected from the Template-defined data collection activities can then be processed (operation 1180) and correlated for use in research study results and output.

Figure 12:
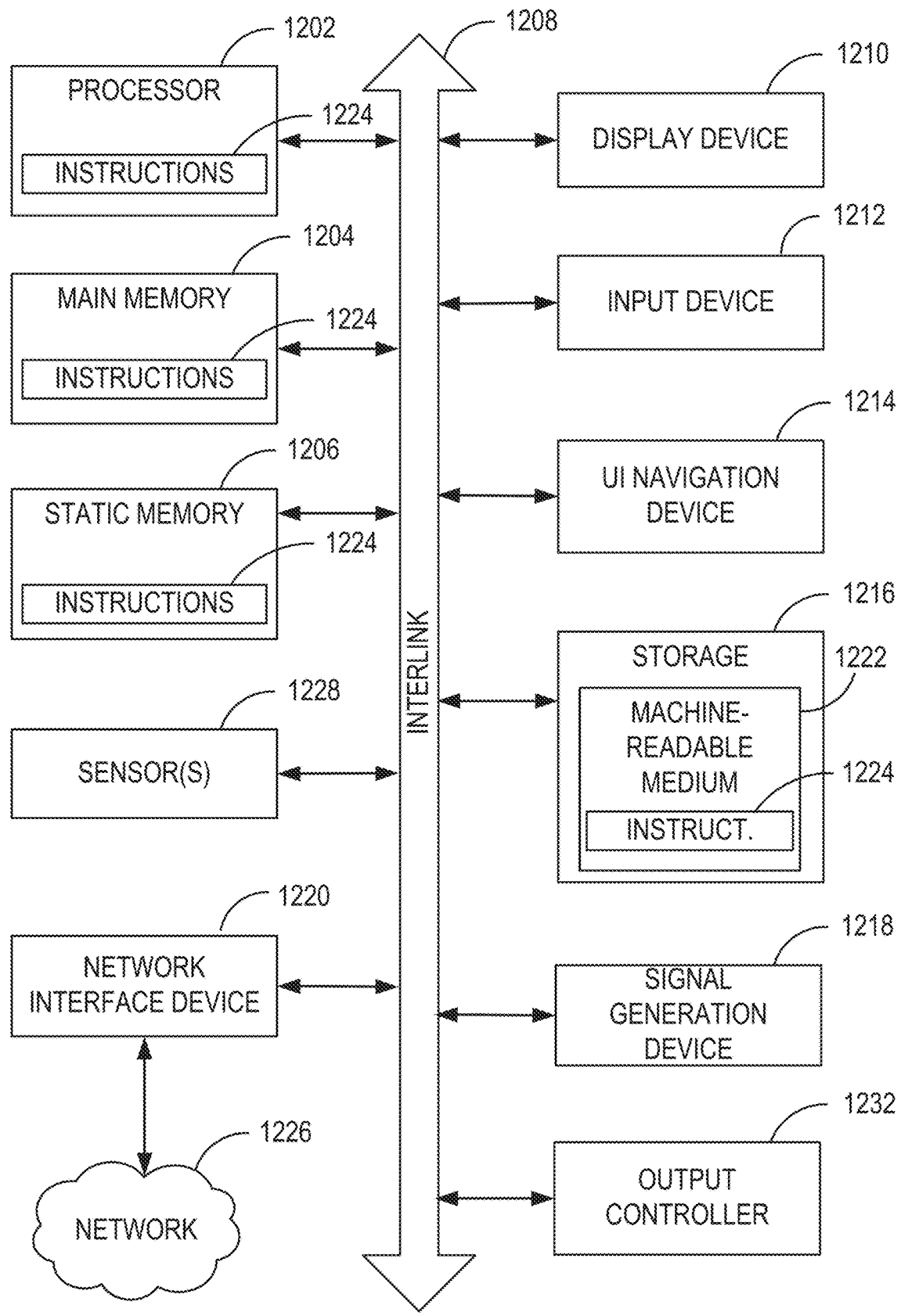
FIG. 12 illustrates an example computer system architecture in which one or more of the methodologies described herein can be implemented.

FIG. 12 is a block diagram illustrating an example computing system machine upon which any one or more of the methodologies herein discussed may be run (and upon which any of the modules or subsystems described herein may be implemented). Computer system 1200 can be embodied as a computing device, providing operations of the components featured in the various figures, including components of the presently described Template management and deployment systems, or any other processing, storage, or computing platform or component described or referred to herein. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The computer system machine may be a personal computer (PC) that may or may not be portable (e.g., a notebook or a netbook), a tablet, a Personal Digital Assistant (PDA), a mobile telephone or smartphone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1200 includes a processor 1202 (e.g., a central processing unit (CPU), a graphics processing unit (GPU) or both), a main memory 1204 and a static memory 1206, which communicate with each other via an interconnect 1208 (e.g., a link, a bus, etc.). The computer system 1200 may further include a video display unit 1210, an alphanumeric input device 1212 (e.g., a keyboard), and a user interface (UI) navigation device 1214 (e.g., a mouse). In one embodiment, the video display unit 1210, input device 1212 and user interface (UI) navigation device 1214 are a touch screen display. The computer system 1200 may additionally include a storage device 1216 (e.g., a drive unit), a signal generation device 1218 (e.g., a speaker), an output controller 1232, and a network interface device 1220 (which may include or operably communicate with one or more antennas, transceivers, or other wireless communications hardware), and one or more sensors 1228.

The storage device 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the computer system 1200, with the main memory 1204, static memory 1206, and the processor 1202 also constituting machine-readable media.

While the machine-readable medium 1222 is illustrated in an example embodiment to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTPS). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LAN, and WAN, using any combination of wired or wireless transmission mediums.

The embodiments described above may be implemented in one or a combination of hardware, firmware, and software. While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Additional examples of the presently described method, system, and device embodiments are suggested according to the structures and techniques described herein, and as may be specified in claims. For example, the subject matter described herein may be embodied by a method performed by a client device (e.g., a computer system), performed by a computing device having at least one processor and at least one memory, and the method implemented by operations performed using the processor and the memory. As another example, the subject matter described herein may be embodied by a server-performed method, performed by a computing device having at least one processor and at least one memory, the method implemented by operations performed using the processor and the memory.

As yet another example, the subject matter described herein may be embodied by a non-transitory machine-readable medium, the machine-readable medium including instructions, which when executed by a machine having a hardware processor, causes the machine to perform operations of the client- or server-performed method(s).

Other non-limiting examples may be configured to operate separately, or can be combined in any permutation or combination with any one or more of the other examples provided above, or throughout the present disclosure.

What is claimed is:

1. A method to configure a particular research program, comprising one or more templates being deployable among a plurality of human study participants and using operations performed within a computing system, the operations comprising:
    associating a template with one or more instruments including a software application of a mobile device, the one or more instruments configured to manage program data for the particular research program;
    associating the template with one or more tools available to the computing system, the tools used to process the program data for the particular research program;
    associating the template with a data set definition for the particular research program, the data set definition used to define properties that manage the program data with the one or more instruments;

defining one or more rules of operation for the template, the rules of operation configured to apply the tools to the program data for the particular research program;

defining a participant user interface within the template for interaction with a respective participant of the plurality of human study participants, wherein the participant user interface exchanges the program data with the respective participant in the form of survey assessments and feedback via a mobile device in the possession of the respective participant, in connection with the particular research program; and outputting the template for use in the particular research program, wherein the template is deployed to the mobile device to cause output and receive input and to exchange the program data with the respective participant via the one or more instruments.

2. The method of claim 1, wherein the one or more instruments are configured to manage the program data from interactions with the respective participant according to a protocol assigned to the respective participant from among multiple protocols defined in the template.

3. The method of claim 1, further comprising, establishing the template to deliver one or more interactions tailored to the respective participant as part of the particular research program.

4. The method of claim 1, wherein the one or more rules of operation establish criteria or delivery settings for one or more assessments or interaction activities exchanged with the respective participant, based on a location of the respective participant relative to a particular venue within a pre-defined set of venues.

5. The method of claim 4, wherein the respective participant registers a new venue to the pre-defined set of venues.

6. The method of claim 4, further comprising, delivering interactions tailored to the respective participant and to characteristics of the particular venue.

7. The method of claim 1, wherein the rules of operation include defining a period for interacting with the respective participant using the one or more rules of operation for the template.

8. The method of claim 7, further comprising, associating the period for interaction with the respective participant based on a location of the respective participant relative to a particular venue.

9. The method of claim 1, wherein the template defines characteristics of the particular research program, and wherein the template is deployable for the plurality of human study participants in respective projects as part of the particular research program.

10. The method of claim 9, further comprising, associating the respective participant with a second participant as part of a particular research program.

11. The method of claim 10, further comprising, delivering an interaction tailored to the respective participant based on rules applied to program data obtained from an interaction with the second participant.

12. The method of claim 11, further tailoring the interaction with the respective participant based on a location of the second participant relative to a particular venue.

13. A method to deploy a template for use in a research program, using operations performed within a computing system of a respective participant of a plurality of human study participants, the operations comprising:

obtaining the template, the template being associated with one or more instruments including a mobile device software application available to the computing system to manage program data, and the template being associated with a data set definition for the research program;

defining a plurality of configuration parameters of the one or more instruments for the research program based on the template;

tailoring the configuration parameters to deliver an interaction with the respective participant based on characteristics related to the respective participant; and deploying the template to interact with the respective participant in connection with the research program and to perform data management activities via the one or more instruments, wherein the deploying of the template includes use of a definition of a participant user interface within the template for interaction with the respective participant, and wherein the participant user interface is configured to exchange the program data with the respective participant in the form of survey assessments and feedback via a mobile device in the possession of the respective participant, in connection with the research program.

14. The method of claim 13, further comprising, processing a set of program data obtained via the data management activities to create an interaction tailored for the respective participant, the activities performed based on configuration parameters in the template.

15. The method of claim 13, further comprising, selecting the template for use in the research program to perform the data management activities for the respective participant.

16. The method of claim 15. wherein the template is deployed for the respective participant and includes a set of pre-defined venues.

17. The method of claim 16, further comprising, processing a set of program data to create one or more interactions tailored for the respective participant, the interactions performed based on a location of the respective participant relative to a particular venue within the pre-defined set of venues.

18. The method of claim 16, further comprising, processing one or more rules of operation allowing the respective participant to register a new venue to the pre-defined set of venues.

19. The method of claim 16, further comprising, processing a set of program data to create one or more interactions tailored for the respective participant, the interactions being tailored to a particular venue within the pre-defined set of venues and to pre-defined participant characteristics.

20. The method of claim 19, further comprising, performing the one or more interactions tailored for the respective participant based on a location of the respective participant relative to the particular venue within the pre-defined set of venues and to the pre-defined participant characteristics.

21. The method of claim 15, further comprising, associating the respective participant with a second participant as part of a particular research project, wherein the template is deployable for the plurality of human study participants in respective projects as part of the research program.

22. The method of claim 21, further comprising, delivering an interaction tailored to the respective participant based on rules applied to program data obtained from an interaction with the second participant.

23. The method of claim 22, further tailoring the interaction with the respective participant based on a location of the second participant relative to a particular venue.

24. A computing system, comprising:

processor circuitry; and a storage medium including instructions that, when executed by the processor circuitry, cause the computing system to configure a particular research program for human study participants, with operations that:

associate a template with one or more instruments including a software application of a mobile device, the one or more instruments configured to manage program data for the particular research program;

associate the template with one or more tools available to the computing system, the tools used to process the program data for the particular research program;

associate the template with a data set definition for the particular research program, the data set definition used to define properties that manage the program data with the one or more instruments;

define one or more rules of operation for the template, the rules of operation configured to apply the tools to the program data for the particular research program;

define a participant user interface within the template for interaction with a respective participant of the human study participants, wherein the participant user interface exchanges the program data with the respective participant in the form of survey assessments and feedback via a mobile device in the possession of the respective participant, in connection with the particular research program; and output the template for use in the particular research program, wherein the template is deployed to the mobile device to cause output and receive input and to exchange the program data with the respective participant via the one or more instruments.

25. The computing system of claim 24, the instructions further to cause operations that:

associate the respective participant with a second participant as part of a particular research project;

deliver an interaction tailored to the respective participant based on rules applied to program data obtained from an interaction with the second participant; and tailor the interaction with the respective participant based on a location of the second participant relative to a particular venue;

wherein the template defines characteristics of the particular research program, and wherein the template is deployable for the human study participants in respective projects as part of the particular research program.

* * * * *